United States Patent [19]

Starkey

[11] Patent Number: 5,592,664
[45] Date of Patent: Jan. 7, 1997

[54] DATABASE SERVER SYSTEM WITH METHODS FOR ALERTING CLIENTS OF OCCURRENCE OF DATABASE SERVER EVENTS OF INTEREST TO THE CLIENTS

[75] Inventor: James A. Starkey, Manchester, Mass.

[73] Assignee: Borland International Inc., Scotts Valley, Calif.

[21] Appl. No.: 276,739

[22] Filed: Sep. 7, 1994

Related U.S. Application Data

[63] Continuation of Ser. No. 737,382, Jul. 29, 1991.

[51] Int. Cl.⁶ .................................................. G06F 17/30
[52] U.S. Cl. ........................................... 395/600; 395/427
[58] Field of Search .................................. 395/600, 425, 395/650, 200

[56] References Cited

U.S. PATENT DOCUMENTS

| | | | |
|---|---|---|---|
| 4,374,409 | 2/1983 | Bienvenu et al. | 395/650 |
| 4,395,757 | 7/1983 | Bienvenu et al. | 395/650 |
| 4,635,139 | 1/1987 | Kendall | 395/600 |
| 4,635,189 | 1/1987 | Kendall | 395/600 |
| 4,642,758 | 2/1987 | Teng | 395/600 |
| 4,853,843 | 8/1989 | Ecklund | 395/600 |
| 4,855,906 | 8/1989 | Burke | 395/600 |
| 4,941,084 | 7/1990 | Terada et al. | 395/650 |
| 4,965,718 | 10/1990 | George et al. | 395/425 |
| 5,060,150 | 10/1991 | Simor | 395/325 |
| 5,133,075 | 7/1992 | Risch | 395/800 |
| 5,280,612 | 1/1994 | Lorie et al. | 395/600 |

OTHER PUBLICATIONS

Masterson, *Interbase: The OLCP Server*, Data Based Advisor, vol. 10, No. 6, pp. 1–5, Jun. 1992.
*Understanding Event Alerters*, Data Based Advisor, Feb. 1992.
Darling, *Discovering Interbase*, DBMS, Jan. 1993.
Rennhackkamp, *Using Ingres Event Alerters*, DBMS, pp. 86–88, 90, 92, 108, Nov. 1992.
McGoveran, *Online Complex Processing*, DBMS, Oct. 1992.
Edelstein, *Using Stored Procedures and Triggers*, DBMS, Sep. 1992.
*Domain/OS Call Reference*, vol. 1, Hewlett–Packard Company, Workstation Systems Division, Edition E0392, 1992, pp. EC2 , EC2–1.
Finkelstein, *Multiuser Databases: the SQL*, BYTE, pp. 136–140, 142, 144, 146, 148–149, May 1990.

*Primary Examiner*—Thomas G. Black
*Assistant Examiner*—Peter Y. Wang
*Attorney, Agent, or Firm*—John A. Smart; Vernon A. Norviel; Michael J. Ritter

[57] ABSTRACT

An event alerter system for notifying one application or process of a change in a database. A database management system includes an event generator that defines events to be reported, such as a change in a particular field of the database. Each time an change occurs, the event generator notifies an event manager of the name of the event. Whenever an event dependent process indicates an interest in a change in a field in a particular record or records in a database, it transfers a command to the event manager identifying each such record and change. When the event dependent process issues such a command, it enters a wait state to process the occurrence of an event in either a synchronous or asynchronous mode. The event manager converts such a command into entries in an event table that identifies, for that and other event dependent processes, the list of events in which a process has an interest. Thereafter, each time the event generator signals a change, the event manager examines the event table to determine which, if any, event dependent processes have an interest in that particular change and only three event dependent processes that have requests for being notified of the change pending. Then the event dependent process can obtain a message containing the status of each event in which it has an interest.

25 Claims, 24 Drawing Sheets

```
modify database "commodities.gdb";

define trigger for commodities
   modify :
      if (new.price ne old.price)
   post new.name;
end_trigger;
```

*FIG. 3*

```
database db = "commodities.gdb";
{ ready;
start_transaction;

event_init e ("SOYBEANS", "PORKBELLIES");

for x in commodities
   printf("%s %d\n", x.name, x.price);
end_for;

commit;

for (;;)
   {
   event_wait e;
   start_transaction;
   for x in commodities
      printf("%s %d\n", x.name, x.price);
   end_for;
   commit;
   } finish;
}
```

*FIG. 4*

DATABASE SERVER SYSTEM WITH METHODS FOR ALERTING CLIENTS OF OCCURRENCE OF DATABASE SERVER EVENTS OF INTEREST TO THE CLIENTS

This is a continuation of application Ser. No. 07/737,382 filed Jul. 29, 1991, now pending.

BACKGROUND OF THE INVENTION

1. Field of the Invention

This invention generally relates to communications between applications or processes in a data processing system or network and more specifically to communications adapted for use in a database management system that alert one or more applications that another application has caused a change the database.

2. Description of Related Art

Database management systems have become important tools recent years because they enable a quick and inexpensive retrieval of specific data from a large amount information in response to a number of criteria and facilitate the maintenance of that information. Database management systems have two basic components commonly called a "database" and a "database manager" that typically reside in a data processing system or a network of data processing systems. Databases include census information, airline schedules, stock prices and library catalogs to name a few examples and typically are stored in disk storage facilities. A database manager includes various software that enables the maintenance of and access more databases. It is the database manager that enables the addition, deletion and modification of data in the database and the transfer of data from the data base.

A data processing network has the capability of transferring information between various identified nodes on a communications path. Each node may comprise any of a variety of data processing equipment and components. In a typical network installation, a database management system may locate a database in a storage means at one node and the database manager, or portions thereof, at the database node or at any other node that can communicate with the database.

Communications over the network between nodes may take the form of messages or packets that contain an actual message and a number of overhead or communications related messages for controlling the communications. In many networks, the time required to transfer an actual message is essentially independent of the length of the actual message because the time required to process overhead or communications related messages and the communications programs they invoke are very long in comparison to those required to process the actual message.

Although this invention can be implemented on a number of different database management systems, the invention and its background are most readily understood by describing them in terms of a relational database management system provided by the assignee of this invention, Interbase Software Corporation. A relational database as found in such a system contains data that users perceive as a collection of relations. Each such relation comprises a number of records and each record contains one or more fields. Each field has a name and contains data. In other database management systems phrases such as "table-row-column", "table-tuple-domain" or "file-record-field" are synonymous for the "relation-record-field" syntax used in the Interbase Software Corporation relational database management system.

As an example, a simple relational database called "commodities" might have a series of records each containing several fields. A field called "Name" in each record would identify a particular commodity, such as pork bellies, soybeans or sugar. Another field called "Price" in each record would contain the price of the named commodity. Still another field called "Trades" would record the number of shares traded on a given day. Another relational database called "monitor" might have a series of records each containing "Sensor Name" and "Sensor Value" fields for monitoring the outputs from a number of different sensors in a chemical or similar process.

Database management systems usually allow the construction of various applications or user programs that modify the database by adding or deleting records or by changing fields in the records or by adding fields to or deleting fields from the records, all on a selected basis. Other applications produce reports or evoke other responses based upon selected data in the database. For example, an application might generate a report listing the name and price of every record or a subset of selected records from the previously defined commodities or monitor databases.

It oftentimes is desirable to produce a report or evoke some action whenever a value in a particular field changes or values in a combination of fields change. A report, for example, might take the form of a message sent to a particular broker using the commodities database whenever the price changes for a particular commodity or subset of commodities. Evoking an action might take the form of initiating some particular control action whenever the output from a sensor, as recorded in that sensor's Sensor Value field, exceeds some threshold value.

In each of the foregoing and other examples it is necessary to establish communications with one application that depends upon the occurrence of an event in response to changes produced by another application. Several approaches exist for reporting the occurrence of such events in prior art data processing systems including those that contain database management systems.

In dedicated data processing systems, an interruption subsystem handles such communications when an event occurs. Each possible event has an interruption priority and transfers an interruption signal to the interruption subsystem. When the interruption subsystem responds to the interruption signal, it stops further processing of any application and initiates an interruption process for responding to the interruption signal with the highest priority. This interruption process may either poll all possible interrupting sources or receive a vector address that identifies an application interruption process to identify the interruption source and an appropriate response.

In many cases, there is no synchronization between the occurrence of an event and the operation of the interruption process, particularly when an event with a low priority must compete with higher priority events for use of resources in the data processing system. In such situations significant delays between the event and the response can occur or, in some cases, the system may fail to produce any response to the event. As a result, the viability of this approach tends to be limited to single data processing systems that use reasonably short interruption processes to respond to a reasonably small number of events that occur asynchronously to an application. Interruptions produced by keyboards, clocks, external sensors and related devices are examples of interruptions that typically require relatively short interruption processes that do not necessarily monopolize the data processing system for significant time periods.

As disk memories became more popular with the attendant development of disk operating systems, communications by means of interruptions became more complex to implement. One manufacturer has proposed to use event counters operating under the disk operating system to provide such communications. In accordance with this approach, the operating system manipulates a first array of event counters and a second array that contains a threshold value for each of the counters. When an application is to wait for the occurrence of one or more events, it specifies the corresponding events by identifying addresses in each of the arrays and then entering a wait state. When an event occurs, the operating system restarts the application. The application then determines whether an event of interest has occurred and performs certain housekeeping chores to maintain a correct correlation between the event counter and the application.

Although this approach provides a means for establishing communications between two applications, the applications must run on the same node in a network. It is not possible to implement this approach on a network with multiple systems of the same or different manufacturers because it is impossible, from a practical standpoint, to allow different systems to access specific locations in one system's memory. Further, the definition of an event counter for other than certain predetermined conditions does not always produce repeatable and predictable results. Thus, this approach is not practicable to apply to database systems where the change in a field or number of fields is of interest to one or more applications that operate at a single site or multiple nodes in a homogeneous or heterogenous network.

Prior database systems use polling techniques to monitor changes in the database. Such polling techniques repetitively access the database to determine if a change has occurred in any selected field. A polling technique might require (1) an identification of the database, a record or records and a field or fields of interest, (2) the retrieval of the field or fields, (3) a determination if the field has changed and (4) the notification of any application interested in that change. As well known, the repetition rate for such polling techniques must be at least two times greater than the maximum frequency at which each field changes; otherwise changes can occur without detection. As the repetition rates increase to provide adequate sampling, these polling programs can require a significant percentage of available resources even in a dedicated system. This use of resources can degrade overall system performance either by interrupting other applications or by being interrupted with the potential for missing some change.

These disadvantages become evident particularly when the database management system operates in a network environment and the polling repetition rate increases. Even when polling procedures require only a minimal level of resource utilization, problems can still exist in a heterogeneous network characterized by the presence of data processing equipment from different manufacturers at different nodes. Polling in such heterogenous networks, even if possible, can increase the demands on various network resources to unacceptable levels. However, notwithstanding these various disadvantages, polling has continued to be the dominant method of monitoring a database for a change in the value of any field.

SUMMARY

Therefore, it is an object of this invention to provide an improved procedure for notifying an application whenever a field in a database changes.

Another object of this invention is to provide an improved procedure for notifying an application whenever a field in a database changes independently of the application.

Yet another object of this invention is to provide an improved procedure for notifying plural applications whenever a field in a database changes independently of the applications.

Still another object of this invention is to provide an improved procedure for notifying plural applications whenever a field in a database changes independently of the applications even when the applications are at different nodes in a data processing network.

Still yet another object of this invention is to provide an improved procedure for notifying plural applications whenever a field in a database changes independently of the applications either asynchronously or synchronously.

Yet still another object of this invention is to provide an improved and simplified procedure for notifying, on a selective asynchronous or synchronous basis, plural applications at remote nodes in either a homogeneous or heterogenous data processing network whenever a field in a database changes.

These and other objects and advantages are achieved in a general system environment by an event alerter system. An event generator in the general system generates an event signal each time an event, such as a field change or some external condition, occurs. Typically a general system will include an event dependent means for performing some function in response to the occurrence of the event. An event table has an event counter for recording the total number of events that occur. An event manager communicates with the event table and alters the contents of each counter each time a corresponding event signal occurs. The event manager also signals the event dependent means and has the ability to transfer the contents of the event counter to the event dependent means.

In the environment of a database management system, a first application or process can cause a database manager to modify fields in the database while a second application or process depends upon receiving a notification of any modification. In accordance with this invention, an event trigger that defines a condition generates a posting signal each time the first process effects a change in any record that meets the required condition. An event table at the database manager identifies the second application or process. An event manager signals the second application or process and any other processes listed in the event table in response to the posting signal. Then the second application or process, and any others, respond to the signal from the event manager by retrieving the event counts for each event of interest.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 depicts the definition of a trigger that is an embodiment of an event generator shown in FIG. 1;

FIG. 4 is an example of an event dependent process for use in accordance with this invention;

DESCRIPTION OF THE ILLUSTRATIVE EMBODIMENTS

Figure 1:
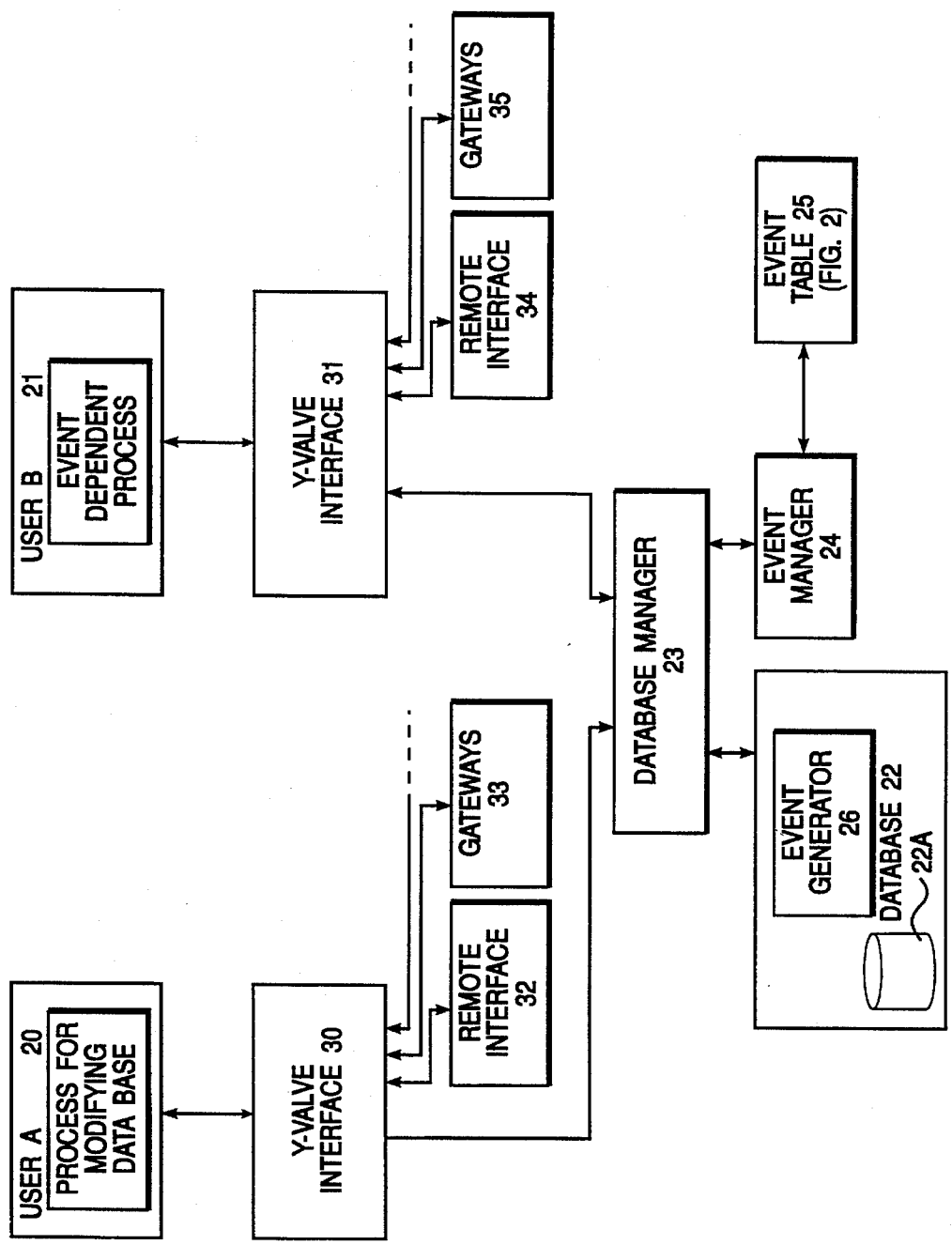
FIG. 1 is a block diagram of a network with a database management system that includes an event alterer that embodies this invention for operation with a first or modifying process and a second or event dependent process.

FIG. 1 is a simplified schematic block diagram of portions of a data processing network for purposes of disclosing this invention. The specific implementation of the network is not critical to an understanding of this invention. Functionally, blocks 20 and 21 represent two different "users", namely USER A and USER B. In this embodiment, both users have access to a database 22 that resides on a disk memory system 22A and access the database by means of processes identified as a USER A process and a USER B process.

A database manager 23 connects to the disk memory system 22A and controls access to the database 22. Data in the database 22 defines a series of relations, each with a record containing one or more fields. For purposes of explanation, it is assumed that the disk memory system 22A contains the commodities database defined above with NAME and PRICE fields for each of several commodities, as follows:

| NAME=soybeans | NAME=porkbellies |
|---|---|
| PRICE=1.15 | PRICE=2.25 |

It also is assumed for purposes of this explanation, that the USER A process is adapted for modifying the commodities database while the USER B process is an event dependent process that depends upon the occurrence of a event, for example a change in the price of soybeans.

In essence, this invention allows the USER A process to change the database independently of the USER B process and yet enable the database management system to signal changes to the USER B process without requiring the USER B process or any other process to undertake polling operations. An event manager 24 communicates with the database manager 23 and an event table 25 and coacts with an event generator 26 at the database 23 to provide this notification.

For purposes of completeness, the data processing network in FIG. 1, additionally includes two conventional "Y-valve interfaces" 30 and 31. The Y-valve interface 30 connects the USER A process to the database manager 23 and to other network components such as a remote interface 32 and various gateways 33. Similarly, the Y-valve interface 31 couples the USER B process to the database manager 23 and to other network components such as a remote interface 34 and various gateways 35. Each Y-valve interface may also couple its respective USER processes to other network components, not shown specifically but represented by a dashed line from each Y-valve interface. With respect to this invention, a Y-valve interface converts certain high-level commands from an application or process, such as the USER B process, to an appropriate sequence of commands for the event manager 24. At other times a Y-valve interface effects communications between the database manager 23 and the network operating system, such as a UNIX or VMS operating system.

This invention requires interaction among the database manager 23, the event manager 24, the Y-valve interfaces and the operating systems associated with each data processing system. Many of these communications are based upon interactions between the event manager 24 and the event table 25. Therefore, it will be helpful to describe architecture of the event table 25 in detail before proceeding with a description of each interaction.

THE EVENT TABLE

Figure 2:
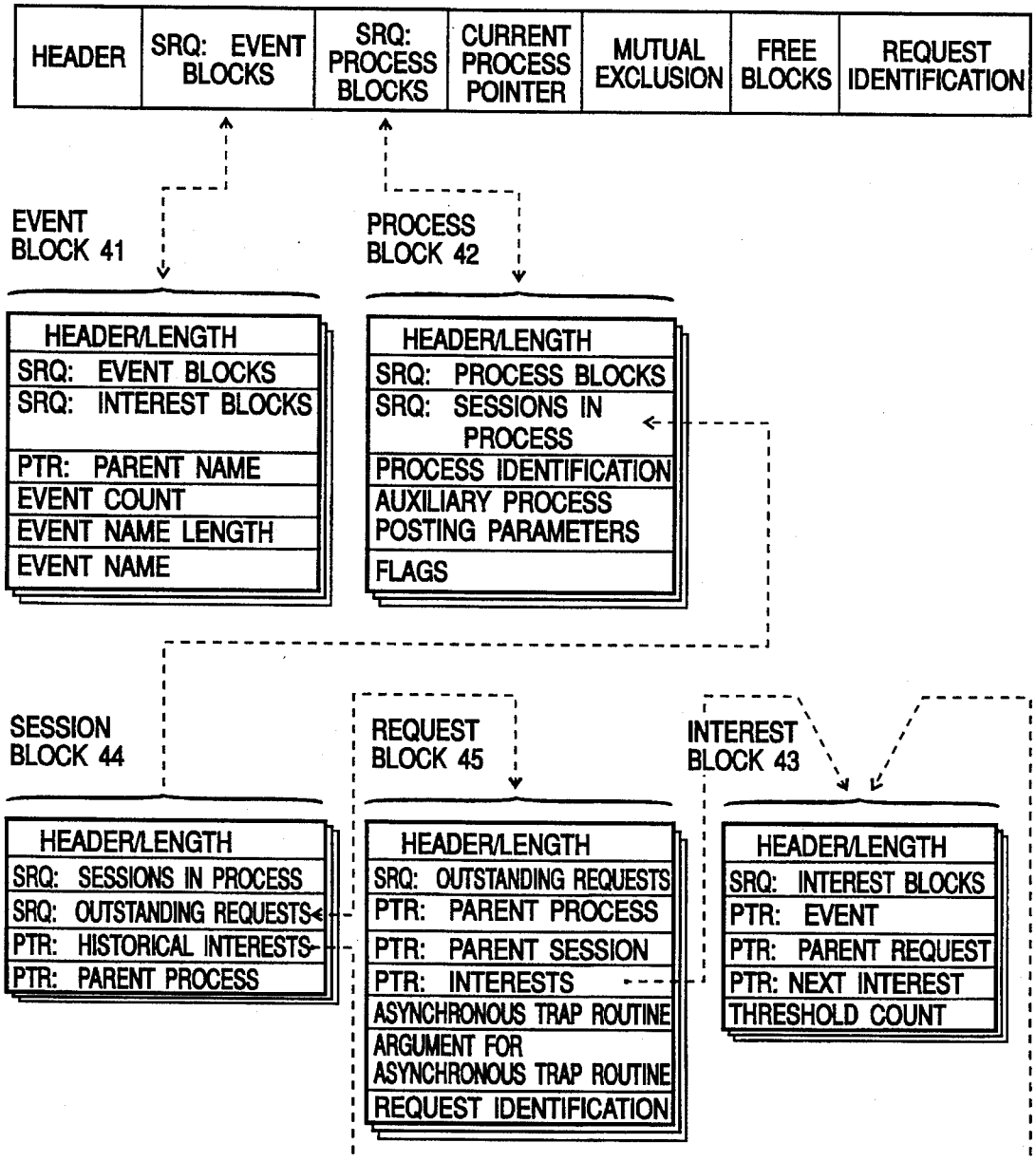
FIG. 2 is a memory map that depicts the organization of the event table shown in FIG. 1.

FIG. 2 is a representative memory map of the event table 25 in FIG. 1. This event table 25 contains all the information required for alerting an application when an event occurs. The contents of this memory are dynamic as they represent the current state of each application. In a typical implementation, shared memory stores the event table 25 so different portions of the event table 25 may be stored in discrete locations. Different addressing schemes can implement such a memory when it is shared with applications at diverse nodes in a network. One known scheme uses absolute and relative address pointers, for example. As such addressing schemes are known, the details by which the event manager 24 identifies a particular location in the event table 25 are omitted from the following description.

As shown in FIG. 2, the event table 25 comprises a series of "blocks" of contiguous virtual memory locations, each memory location comprising a "byte". The data in each of these blocks must remain in contiguous memory locations, but there is no requirement that two blocks be in contiguous memory locations. Related blocks may be organized in either linked lists or in self-relative queues. In a linked list, an initial pointer in a parent block points a first block in the list. Each block in the list points to the next block in the list; the pointer in the last block in the linked list has a null value.

Self-relative queues utilize pairs of pointers having a forward pointer and backward pointer at a queue pointer location. A first pair constitutes the head of the queue and its forward and backward pointers identify the locations of the pointer pairs in the first and last blocks, respectively. The forward pointer in a first block in the self-relative queue points to the pointer pair in the second block, while the backward pointer in the first block points to the pointer pair at the head of the queue. Likewise, the forward pointer in a last block in a self-relative queue points to the pointer pair at the head of the queue while the backward pointer identifies the location of the pointer pair in the next-to-last block. When a self-relative queue is either initialized or becomes empty, both pointers in the head of the queue point to the location of that pair. In the following discussion the mnemonic "SRQ" identifies a self-relative queue.

1. THE EVENT TABLE HEADER 40

The event table 25 has an event table header 40. The location of the event table header 40 is the location in the event table 25. It contains several sections that directly or indirectly define the entire event table as follows:

A HEADER section includes a length byte that specifies the number of consecutive bytes in the header 40.

An SRQ: EVENT BLOCKS section is the head of a self-relative queue of all event blocks, such as an event block 41.

An SRQ: PROCESS BLOCKS section is the head of a self-relative queue of all process blocks, such as a process block 42.

A CURRENT PROCESS POINTER section locates the current process block, such as a process block 42, that has acquired the event block 25.

A MUTUAL EXCLUSION section is useful in controlling access to the shared memory that the event table 25 occupies.

A FREE BLOCKS section identifies the location of a first free memory block in the event table 25.

A REQUEST IDENTIFICATION section receives an explicit request identification number.

2. EVENT BLOCKS

The EVENT BLOCK section of the event table header 40 is the head of a self-relative queue of all event blocks, such as the event block 41. There are two types of event blocks, namely: a "parent" event block and a "child" event block. Each event block contains information about one event. For example, in the commodities database, the list will contain a parent event block for the commodities database and two child event blocks. One child event block will contain information about "PORKBELLIES" and the other, information about "SOYBEANS". Each event block has the same basic structure as the event block 41, although the length of each block will vary depending upon the name of the event. More specifically, each event block, like the event block 41, has the following sections and functions, in which:

A HEADER/LENGTH section specifies the number of consecutive bytes in this event block.

An SRQ:EVENT BLOCKS section contains forward and backward pointers to other event blocks in the event table 25.

An SRQ:INTEREST BLOCKS section is the head of a self-relative queue interest blocks 43. As described later, INTEREST BLOCKS are useful in notifying various applications that an event has occurred.

A PTR:PARENT NAME section acts as a pointer to a parent event block in a child event block; it has null value in a parent event block.

An EVENT COUNT section is a counter. Each time an event occurs, the event manager 24 in FIG. 1 increments the EVENT COUNT section for a corresponding child event block. In a parent event block the EVENT COUNT section contains the total number of child event blocks associated with the parent event block.

An EVENT NAME LENGTH and an EVENT NAME section contain, respectively, the number of characters in the event name and the event name, typically without trailing spaces. Using the specific example, if the EVENT NAME contains "PORKBELLIES", the EVENT NAME LENGTH section contains "11". The combination of the PARENT NAME and the EVENT NAME provide a unique identification for each event
block in the event table.

3. PROCESS BLOCKS

Each SRQ:PROCESS BLOCKS section of the event table header 40 is the head of a self-relative queue that contains all process blocks, such a process block 42. In the environment of multi-User and network installations, it is necessary to identify each process accessing the database management system by a unique name to avoid the delivery of information to an incorrect process. Whenever an application or user attaches to the system, the event manager 24 assigns a process identification in the form of a process block address. In some situations a single user may enter the network with multiple applications. If that occurs, the Y-valve and the event manager interact to provide each application with a session identification. Thus, the combination of the data in the process block 42 and a session block 44 provide an unique identification for an application. Each process block will be associated with a different process, and like the process block 42, will have sections and functions in which:

- A HEADER/LENGTH section specifies the number of consecutive bytes in the process block 42;
- AN SRQ:PROCESS BLOCKS section contains the forward and backward pointers to other process blocks in the event table 25.
- AN SRQ:SESSIONS IN PROCESS section is the head of self-relative queue that contains all the session blocks such as the session block 44, associated with the process block 42.
- A PROCESS IDENTIFICATION section contains the process identification of that particular process.
- An AUXILIARY PROCESS POSTING PARAMETERS section that contains, for certain operating systems associated with the process, parameters that are useful in communicating with that operating system.
- A FLAGS sections contains various flags, as described later, that are useful in communications among the database manager 23, the event manager 24 and the operating system associated with the database 22 and each of the processes.

4. SESSION BLOCKS

Each session block 44 resides in a sessions self-relative SESSIONS IN PROCESS queue and each session queue will be associated with one process block. The SESSIONS IN PROCESS queue may have one or more session blocks, and each session block, like the sessions block 44, will have the following sections and functions in which:

- A HEADER/LENGTH section specifies the length of each session block.
- A SRQ:SESSIONS IN PROCESS section contains the forward and backward pointers to other session blocks in the self-relative queue for that process.
- An SRQ:OUTSTANDING REQUESTS section is the head of a self-relative OUTSTANDING REQUESTS queue that contains all the request blocks, such as request block 45, associated with a given session.
- An PTR:HISTORICAL INTERESTS section is a pointer that identifies the location of a first interest block, such as the interest block 43, in a linked list of interest blocks. This section assures that information is not lost concerning events even while requests are not pending, as described later.
- A PTR:PARENT PROCESS section is a pointer to the specific process block associated with the session block, i.e, the session's parent process.

5. REQUEST BLOCKS

Each request block stores information relevant to each particular request that may identify one or more events of interest. Each request block, like the request block 45, will have sections and functions in which:

- A HEADER/LENGTH section specifies the length of each request block.
- AN SRQ:OUTSTANDING REQUESTS section contains the forward and backward pointers to other request blocks in the OUTSTANDING REQUESTS self-relative queue associated with a corresponding parent session block, like the session block 44.
- A PTR:PARENT PROCESS section is a pointer to the corresponding parent process block, such as process block 42.
- A PTR:PARENT SESSION section is a pointer to the corresponding parent session block, such as the session block 44.
- A PTR:INTERESTS section is a pointer to a first interest block in a linked list of interest blocks, such as an interest block 43.
- Each of an ASYNCHRONOUS TRAP ROUTINE, ARGUMENT FOR ASYNCHRONOUS TRAP ROUTINE, and REQUEST IDENTIFICATION sections contain information that enables the event manager 24 to communicate with an operating system thereby to alert an application that the event has occurred.

6. INTEREST BLOCKS

Each interest block such as interest block 43, stores information relevant to a particular event for which a request is pending or has been pending. In the commodities database example, the application declares an interest in any change in price of either soybeans or pork bellies. As described later, this declaration establishes or modifies the various ones of the process and session blocks and forms one request block and one interest block for each interest. In terms of the commodities database, the linked list of interests will comprises two blocks. One interest block will be associated with "PORKBELLIES" and the other interest block will be associated with "SOYBEANS". Each interest block, like the interest block 43, will have sections and functions in which:

- A HEADER/LENGTH section specifies the length of each interest block.
- An SRQ:INTEREST BLOCKS section contains the forward and backward pointers to other interest blocks associated with the INTEREST BLOCKS self-relative queue in each event block, like the event block 41.
- A PTR:EVENT section is a pointer to the corresponding event block with the same event name as forms the interest block, such as event block 41.
- A PTR:PARENT REQUEST section is a pointer to the corresponding parent request block, such as the request block 45.
- A PTR:NEXT INTEREST section identifies the location of the next interest block in the linked list of interest blocks.
- A THRESHOLD COUNT section contains a count that filters the notification of events to applications to some predetermined level, as described later. Each event dependent process sets this threshold count whenever it declares an interest in an event.

GENERAL OPERATION

The detailed operation of the event manager 24 can be understood in the context of a specific event generator and a specific event dependent process. FIG. 3, for example, illustrates how a process, such as a USER A process, defines an event generator in the form of a trigger. FIG. 4 illustrates a simple USER B process that is an event dependent process. The actions resulting from these two examples fall into one of seven basic operations as follows:

1. The creation of a session when an event dependent process attaches to the database;
2. The declaration of an interest in an event by an event dependent process and the issue of a request to be notified;

3. The occurrence of an event and the notification to the event dependent process;
4. The delivery of pertinent information concerning an event to the event dependent process;
5. The deletion of a specific request in response to a command from the event dependent process;
6. The completion of an event dependent process with its detachment from the database; and
7. The unexpected detachment of the event dependent process from the database.

The procedure in FIG. 3 creates an event generator in the form of a trigger with a "post" command (called a "post event trigger) that resides in the database 22 independently of any event dependent process. In this particular example, the procedure defines a post event trigger for the commodities database. The statement following the "modify" statement in FIG. 3 defines the conditions under which the trigger will post a command. In this specific example, the trigger posts an event each time the price field in any record of the commodities database changes. Normally the triggers are not defined in an event dependent process; rather a system manager will notify all users of the list of triggers in the database.

FIG. 4 depicts a procedure that is written in a series of high-level statements of a language such as the C language. As written, this procedure constitutes an event dependent process because it defines two events that must occur (i.e., a price change in either soybeans or pork bellies) before the event dependent process can proceed to take some responsive action (i.e., print the prices of all the commodities). The statements in this process command the process to attach to the commodities database, to execute a first transaction to express an interest in two events and then the define a second transaction that responds only after an event occurs. The first transaction includes an "event_init" statement that produces an event buffer for each field listed in the statement. In this example the event buffer has one entry for "SOYBEANS" and another entry for "PORKBELLIES". The "for" loop in this first transaction produces a printed list of all the commodities in the database with their respective prices. A "commit" statement indicates the end of the first transaction.

A second "for" loop follows the first transaction and includes an "event_wait" statement and a second transaction that prints the name and price of each commodity in the database 22. During this "for" loop, the process stops after processing the "event_wait" statement and holds the second transaction in abeyance until the price of either soybeans or pork bellies changes.

The statements in FIGS. 3 and 4 are simple examples of a wide array of statements that can define more complex conditions for the trigger or for a response to an event. For example, the trigger definition in FIG. 3 could define a test for a price change beyond some minimal value or for a combination of different factors. Likewise, the second transaction in the event dependent process of FIG. 4 could include statements that define more sophisticated responses to each event. These variations, however, are not essential to an understanding of this invention, but is important to note that this invention supports such complex triggers and responses.

As well known, it is necessary to compile a series of high-level statements, such as shown in FIG. 4, into a series of statements that are taken from the group of statements that the database manager can process. In this particular embodiment of a database management system, a preprocessor converts the high-level statements of FIG. 4 into a series of intermediate statements in an intermediate object program.

Each intermediate statement then converts into a series of more detailed statements that the database manager and the event manager 24 in FIG. 1 can process directly.

Figure 5:
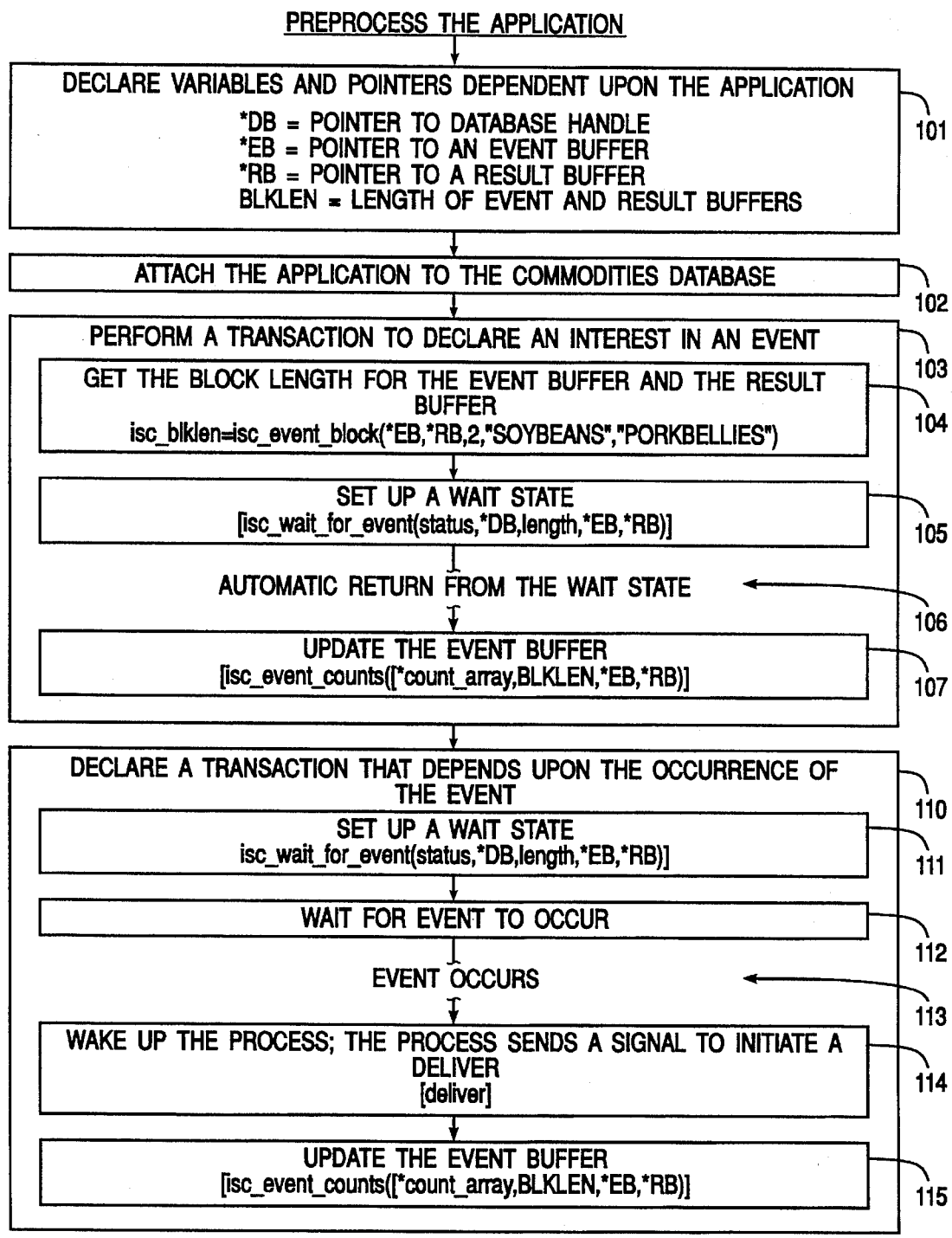
FIG. 5 depicts a procedure for preparing an event dependent process, such as shown in FIG. 4, for execution.

FIG. 5 depicts a series of intermediate level statements that appear in such an intermediate object program after certain statements in FIG. 4 are preprocessed. Initially the preprocessor declares a number of variables (step 101). Variables important to an understanding of this invention include a DB pointer to the database, an EB pointer to an event buffer for the process, an RB pointer to a result buffer for the process, and a BLKLEN variable that contains the length of the event and result buffers. These variables and the buffers they define reside with the event dependent process.

Next, the preprocessor defines the statements that attach the event dependent process or application to the database 22 (step 102). The list of statements for attaching to the database is well known and not disclosed in detail because these operations are not needed for an understanding of this invention.

The event_init command of FIG. 4 declares an interest in certain events, in this example, soybeans and pork bellies. The preprocessor converts this command into four statements that are important to an understanding of this invention (step 103). The first statement is an "isc_event_block" statement (step 104). This statement causes the database management system to form an event buffer and an identical result buffer with an entry in each for each event the "event_init" command of FIG. 4 lists. In this particular example, each of the event and result buffers will have entries for "SOYBEANS" and "PORKBELLIES". The second statement "isc_blklen" obtains the length of these buffers (step 104). The third statement is an "isc_wait_for_event" statement (step 105) that identifies the database and the length and locations of the event and result buffers. The fourth statement is an "isc_event_counts" statement that identifies the location of an array, the length of the buffers and the locations of the event and result buffers.

In general terms, the event manager 24 in FIG. 1 responds to the first three statements by making appropriate entries in the event table 25. The event dependent process enters a wait state after it executes the third statement. The event manager issues an immediate notice that an event has occurred (step 106), so there is essentially no delay between the processing of the third statement and the fourth statement whereby the event dependent process receives the status of each of the named events in its event and result buffers.

Similarly, preprocessing converts the "event_e" statement in FIG. 4 that declares a transaction upon which the second transaction depends (step 110) into another series of intermediate statements including an "isc_wait_for_event" statement (step 111). The execution of this statement will cause the event dependent process to wait for a signal from the event manager 24 that an event has occurred (step 112). The preprocessor also defines a "deliver" statement (step 114) in the event dependent process followed by another "isc-event_counts" command (step 115). When the event occurs (step 113), a signal from the database manager causes the event dependent process to execute the "deliver" statement (step 114) that enables the event manager 24 to transfer information about all the events of interest (i.e., changes to soybeans and pork bellies) to the result buffer in the event dependent process. Then the event dependent process updates its event buffer (step 115).

Figure 6:
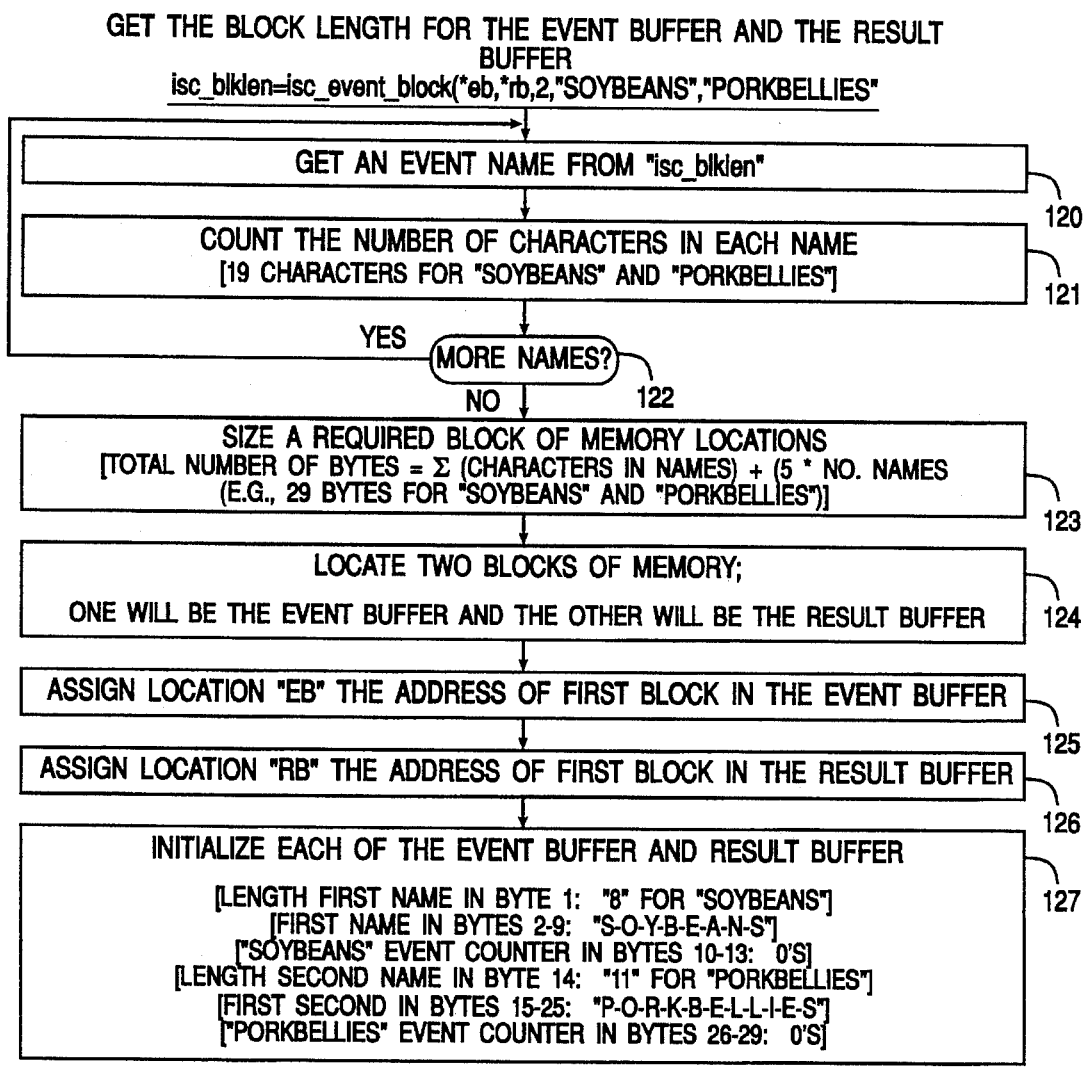
FIG. 6 depicts more detailed procedures for obtaining a block length as required in the procedure of FIG. 5.

FIG. 6 discloses the steps that the database manager 23 takes to process the "isc_blklen" and "isc_event_block" statements in step 104 of FIG. 5. When the database manager 23 receives the "isc_event_block" statement, it receives, as arguments with the command, *EB and *RB pointers set to an initial value and a list of event names, such as "SOYBEANS" and "PORKBELLIES" in the specific example, preceded by a number (i e., "2" in this example) specifying the number of event names in the list. The database manager 23 gets each event name from the list (step 120) in sequence and counts the number of characters in the event name (step 121). When total number of characters in all the event names have been counted (step 122), the database manager 23 calculates the size of a memory block that will required for event and result buffers.

Each buffer requires a memory block with a size equaling the total number of characters for all the names, plus, for each event name, a event name length byte and four additional bytes to serve as an event count register. The "isc-blklen" command transfers this count into the BLKLEN variable. Then the database manager 23 allocates two blocks of memory of appropriate size (step 124) and transfers the address of one block into the *EB pointer as the initial location of the event buffer (step 125) and the address of the other block into the *RB pointer as the address of the result buffer (step 126).

Next the database manager 23 initializes (step 127) each of the event and result buffers. Initially these buffers have identical information for each event in the form:

| Event name length | 1 byte |
|---|---|
| Event name | No. bytes specified in the Event Name length byte |
| Event counter | 4 bytes (initially zero) |

In the specific example shown in FIG. 5, each of the event and result buffers requires 29 bytes and contains the following information:

8-S-O-Y-B-E-A-N-S-0-0-0-0-11-P-O-R-K-B-E-L-L-I-E-S-0-0-0-0

In this example, each buffer records two event names and the event counter in each buffer for each event name is set to an initial value of zero. As previously stated, these buffers reside with the event dependent process (i.e., with the USER B process in the specific example).

The preprocessor issues an "isc_wait_for_event" statement in response to either of the "event_init" or "event_wait" command as shown by steps 105 and 111 in FIG. 5. The database manager 23 uses the two steps of FIG. 7 to execute the "isc_wait_for_event" statement. First, the database manager 23 uses auxiliary procedures to determine whether the event table 25 has corresponding process and session identifications for the event dependent process. If not, the auxiliary procedures send an "EVENT_create_session" command to the event manager 24. The response of the event manager 24 to this command is described later with respect to FIG. 9.

Next, the database manager 23 issues an "EVENT_que" command (step 132) to the event manager 24. This command identifies a session, the database of interest, and each event of interest. In this form, the "EVENT_que" command produces a synchronous wait state. That is, the event dependent process will stop after executing the "event_wait" command and the event dependent process will enter a wait state until an event occurs.

Figure 7:
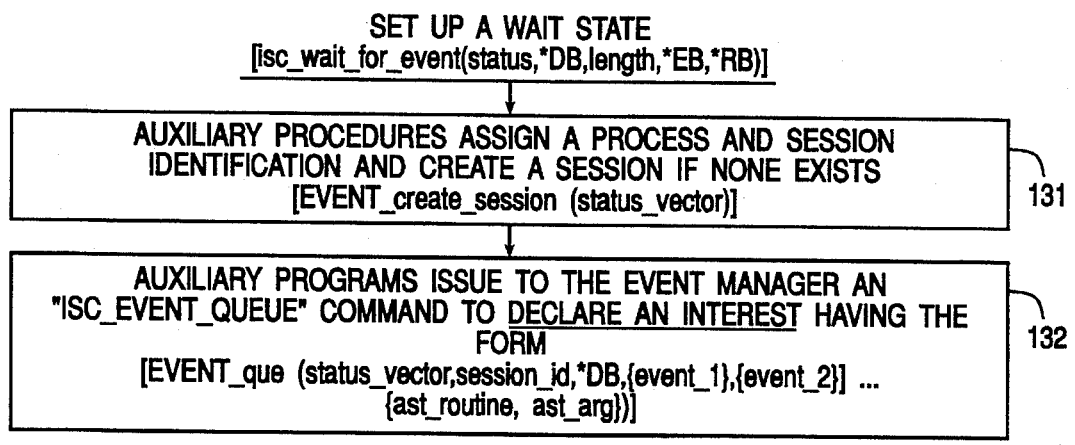
FIG. 7 depicts more detailed procedures for establishing a wait state as required in the procedure of FIG. 5.
Figure 8:
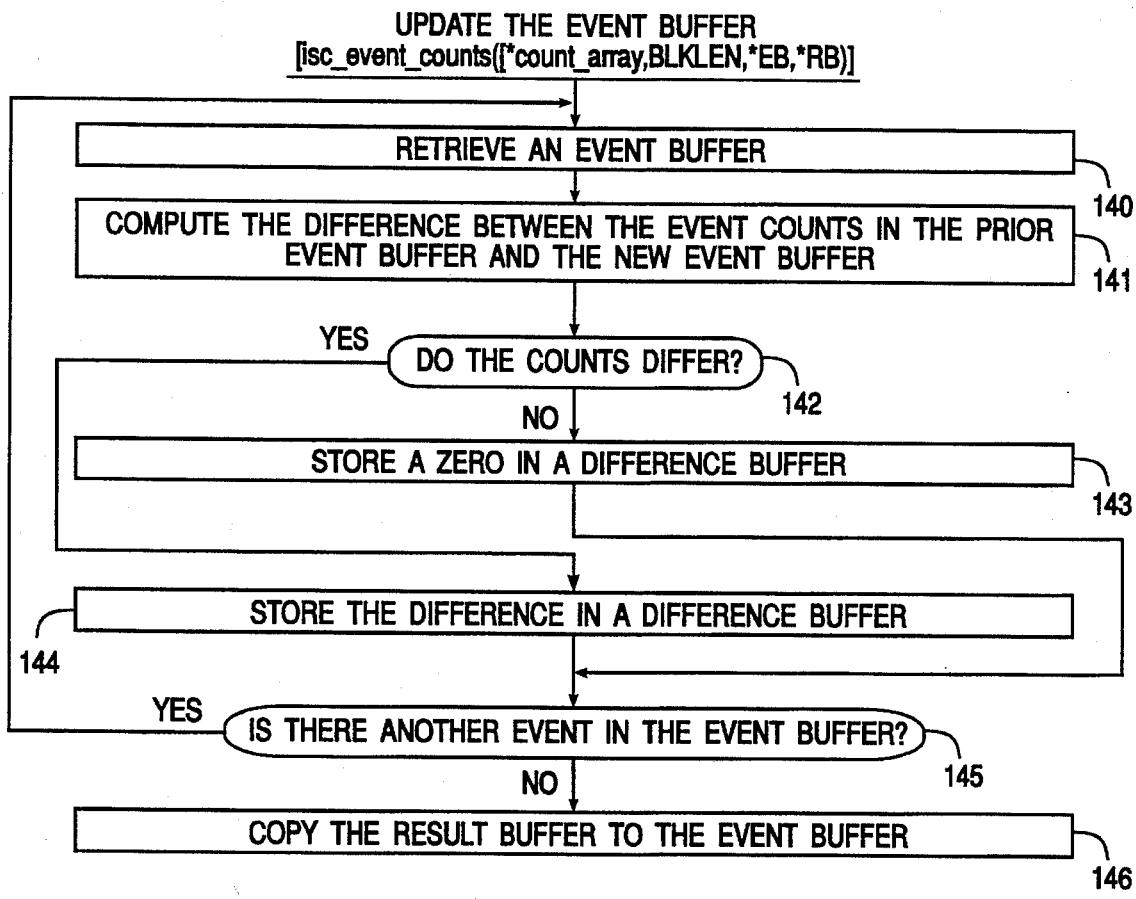
FIG. 8 depicts more detailed procedures for obtaining an event count as required in the procedure of FIG. 5.

In the specifically disclosed database management system being used as a basis for this description, the event manager 24 signals the event dependent process by means of a single asynchronous trap procedure, so the event manager 24 provides the necessary asynchronous trap routine address and appropriate arguments automatically. A similar command, that contains explicit asynchronous trap information, produces an asynchronous wait state. An asynchronous wait state enables the event dependent process to continue with other tasks even before an event has occurred. When an event occurs, the event manager 24 uses the asynchronous trap information and the event dependent process supplies in the asynchronous version of the "isc_wait_for_event" command. In FIG. 7 the arguments "{ast_routine,ast_arg}" represent such trap information supplied with the "isc_wait_for_event" command. With the exception of the asynchronous trap information that is supplied when an event occurs, the response of the event manager 24 to either of the synchronous or asynchronous wait state commands is essentially the same and is described in detail with respect to FIG. 13.

As disclosed in FIG. 5, the event dependent process issues an "isc_events_count" command after an event occurs. This command identifies a memory block called "count-array" the size of the event and result buffers in the "BLKLEN" argument, and the pointers to the event and result buffers. Prior to the execution of this command, the event manager 24 will have transferred information about the reported event into the result buffer during step 114 in FIG. 5. The database manager 24 retrieves this buffer (step 140) in response to the "isc_events_count" command and, for each event in the result buffer, computes the difference between the event counts in the event and result buffers (step 141), placing a zero (step 142) or the difference (step 143) in the "count_array" identified in the command (step 144). When all the event names have been processed (step 145), the database manager 24 copies the result buffer identified by the RB pointer into the event buffer identified by the EB pointer (step 146). The difference array thus identifies which events changed during the process.

Even with this basic understanding of the invention, it will be apparent that the a database management system incorporating this invention has the capability of notifying an event dependent process of the occurrence of an event of interest without continuous polling. A simple set of higher level commands in the event dependent process provide both synchronous and asynchronous wait states. In both, the database manager 23 and event manager 24 cooperate to notify an event dependent process of any change once the event dependent process declares an interest in that event.

The use of a trigger in the database as an event generator allows the database system to monitor events without any communications with event dependent processes. As will become more apparent later, the event manager 24 essentially passes each signal from the triggers through filters that each event dependent process defines. As these filters are located in a single table with the event manager 24, the event manager only notifies an event dependent process if that process has indicated a present interest in being notified and the event occurs. As a result, each event dependent process receives timely notification of events of interest with a minimal level of communications between the database management system and the process. This invention is particularly helpful in improving performance when the database management system is installed on a network. The use of preprocessors and asynchronous traps also enables simple interfaces to exist between data processing equipment at different nodes in both homogeneous and heterogeneous networks.

As previously described, the event manager 24 responds to different commands with one of seven basic operating sequences. Each operating sequence now will be described in the same order and in the same general format. First, there will be discussion of the procedure or circumstances that invoke the particular operating sequence. Second, there will be a detailed discussion of each step in that particular operating sequence. Certain operating sequences utilize subroutines. Each subroutine will be described as a part of the first operating sequence that uses the subroutine. If appropriate, the description will identify the state of the event manager 24 at the end of each operating sequence.

1. The creation of a session when an event dependent process attaches to the database (FIG. 9A and 9B)

The operating system will assign to each event dependent process that accesses the event manager 24 a process identification that uniquely identifies that process in the event manager 24. Normally an event dependent process will constitute a single session for that process. In some situations, however, an event dependent process may have distinct sections that must be handled as separate processes. In accordance with this embodiment of the invention, such separate sections appear as separate sessions under a single process. In either case, the first time a process or session accesses the event manager, auxiliary procedures (see step 131 in FIG. 7) invoke an "EVENT_create_session" operating sequence in the event manager 24 with a status vector address as an argument. As now described, when the event manager 24 completes the operating sequence in response to this command, the event table 25 will have a process block that includes the process identification assigned by the operating system and a session block assigned to the event dependent process, and the event dependent process will have received pointers to these process and session blocks.

Figure 9A:
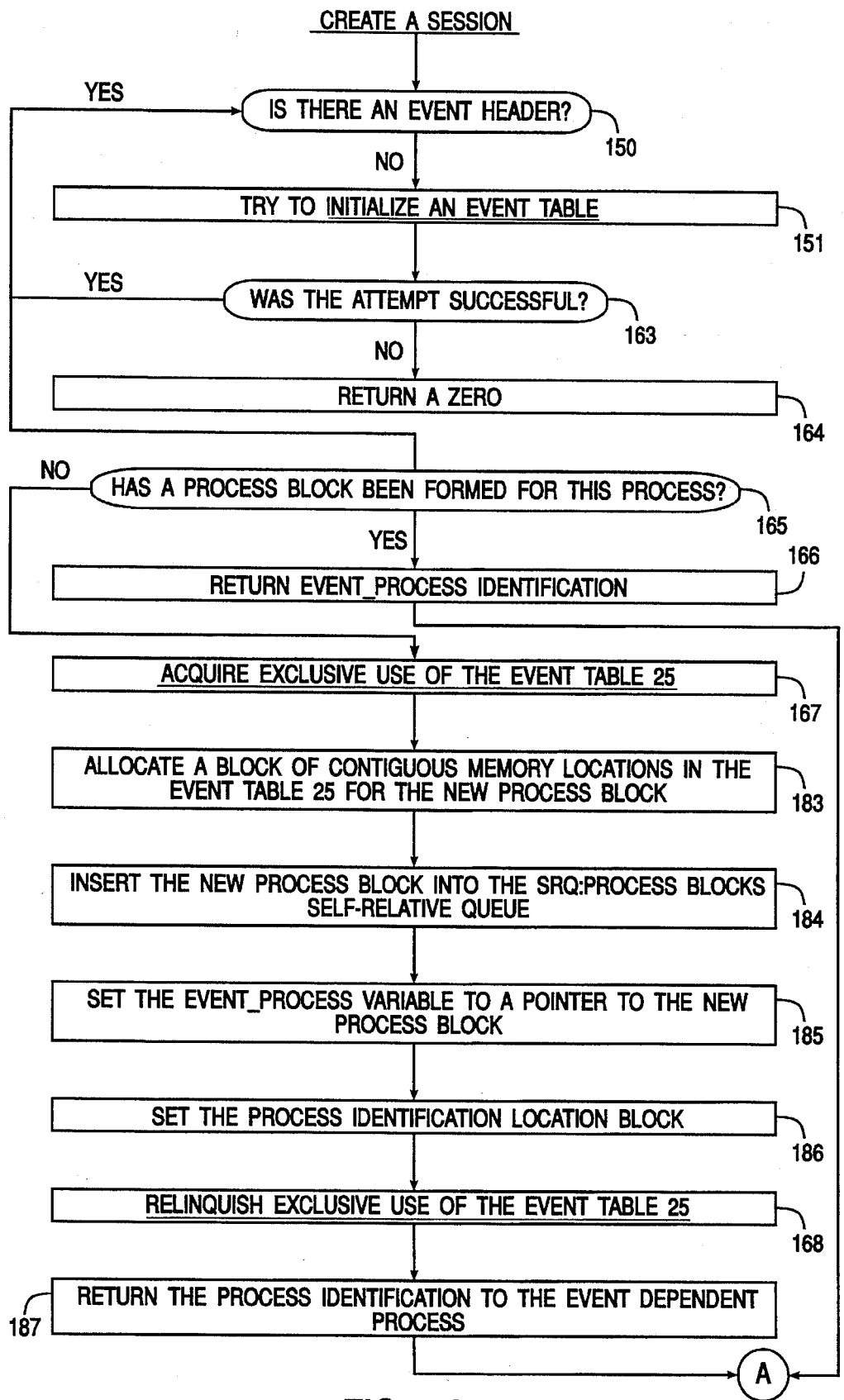
FIGS. 9A and 9B sets forth detailed steps of an initializing procedure the event manager uses to create a session in accordance with the detailed procedure of FIG. 7.
Figure 9B:
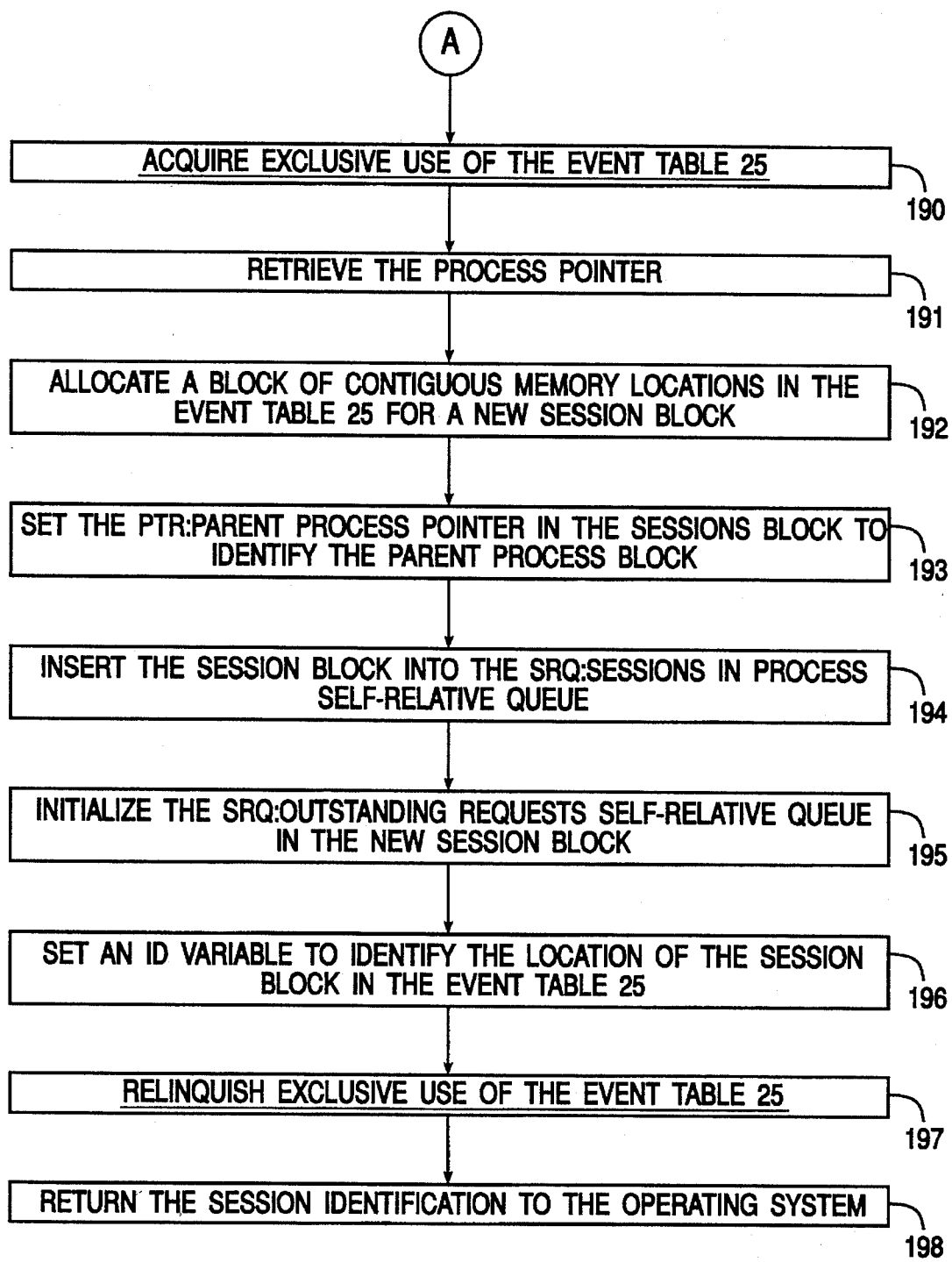

Now referring to FIG. 9A, the event manager 24 determines if the event table header 40 in FIG. 2 exists (step 150) by examining an EVENT_header variable that the event manager 24 defines when it is compiled. If that variable has an address, the event table header 40 exists. If it does not, the event table header 40 does not exist, so the event manager 24 attempts to generate an event table (step 151) by utilizing the initializing sequence of FIG. 10.

a. Initializing the event table 25 (FIG. 10)

Figure 10:
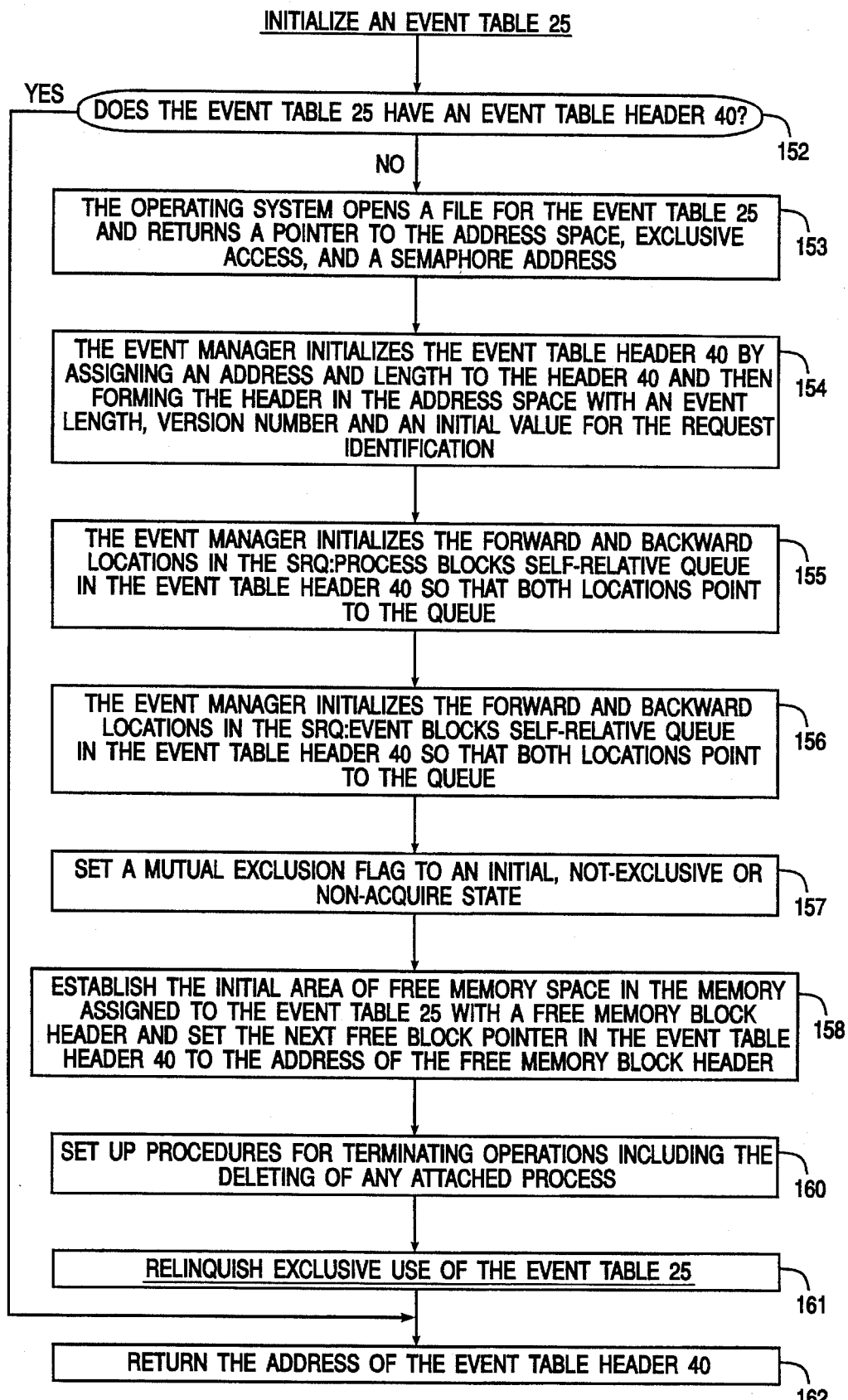
FIG. 10 depicts further detailed steps the event manager uses during the initializing procedure of FIGS. 9A and 9B and during other procedures for initializing the event table of FIG. 2.

Referring to FIG. 10, the event manager 24 again tests for the presence of an event table header (step 152). If no event header exists, the event manager 24 causes the operating system associated with the database manager 23 to open a file for the event table 25 and return a pointer for that address space to the EVENT_header variable for the event manager 24. This step also gives the event manager 24 exclusive access to that event table 25 and allows the event manager 24 to receive various addresses and other information (step 153).

Next the event manager 24 forms the remainder of the event table 25 as the event table header 40 and a block of free memory space (step 154). Specifically, the event manager 24 determines the size of the event table header 40 and forms the header in the free address space for the event table 25 beginning with the address in the EVENT_header variable. The event table header 40, as shown in FIG. 2, is formed with its own header section that identifies the length of the event table header 40 and may include other information. The event manager 24 also inserts a zero in the REQUEST IDENTIFICATION section of the event table header 40 in step 154. Next, the event manager 24 initializes the forward and backward pointers in the SRQ:EVENT BLOCKS section (step 155) and the SRQ:PROCESS BLOCKS section (step 156). Next the event manager sets the MUTUAL EXCLUSION section to an initial, non-exclusive state (step 157) and establishes a first area of the free memory space. This free memory includes all the memory assigned in step 153 minus the space assigned to the event table header 40 in step 158.

It is always possible that some unexpected occurrence can cause a process to detach from the database management system unexpectedly. Power failures, network failures and programming errors in a process represent a few occurrences that can produce such an unexpected detachment. When the event manager 24 initializes the event table 25, it also establishes procedures that are to occur whenever such an unexpected detachment occurs (step 160).

Thereafter the event manager 24 executes a sequence (step 161) that is described later to relinquish exclusive use of the event table 25. The net effect of this step is to set an "acquire_count" variable to an initial zero value. The event manager terminates this initializing process by returning the address of the first location of the event table header 40 to the EVENT_header variable (step 162). If the EVENT_header variable has an address when the test in step 152 occurs, the event manager 24 branches immediately to step 162 bypassing the initializing sequence.

Thus, when the initializing sequence of FIG. 10 completes, space has been allocated in shared memory for the event table 25, the event table header 40 is formed and the EVENT_header variable has the address of the event table header 40. The event table 25 is characterized as having only one entry, namely the event table header 40; the remainder of the event table 25 is free memory space.

Referring again to FIG. 9A, if the initialization procedure returns the address of the event table header 40, the attempt is considered to have been successful (step 163). If the attempt is not successful, the operating sequence terminates by returning a zero (step 164) to the EVENT_header variable, and the event manager 24 executes no further steps.

The event manager 24 next defines an "EVENT_process" variable that identifies a particular process. If the EVENT_process variable has other than a null value, it is assumed to identify a process whereupon the event manager 24 branches (step 165) and returns the event process identification (step 166) before starting the procedure for forming a session block. If the EVENT_process variable has a null value, the event manager 24 branches in step 165 to continue the sequence for forming and identifying a process block.

The first and last operations in creating a process block include the exclusive acquisition of the use of the event table 25 (step 167) and relinquishment of that exclusive use (step 168). These two operations are required because the event table 25 resides in shared memory. As a result there are times during the operation of the event manager 24 when it is very important that no other process have access to the event table 25. The formation of a process block is an example of an operation of the event manager 24 that requires such exclusive access.

b. Acquiring exclusive control of the event table 25 (FIG. 11).

Figure 11:
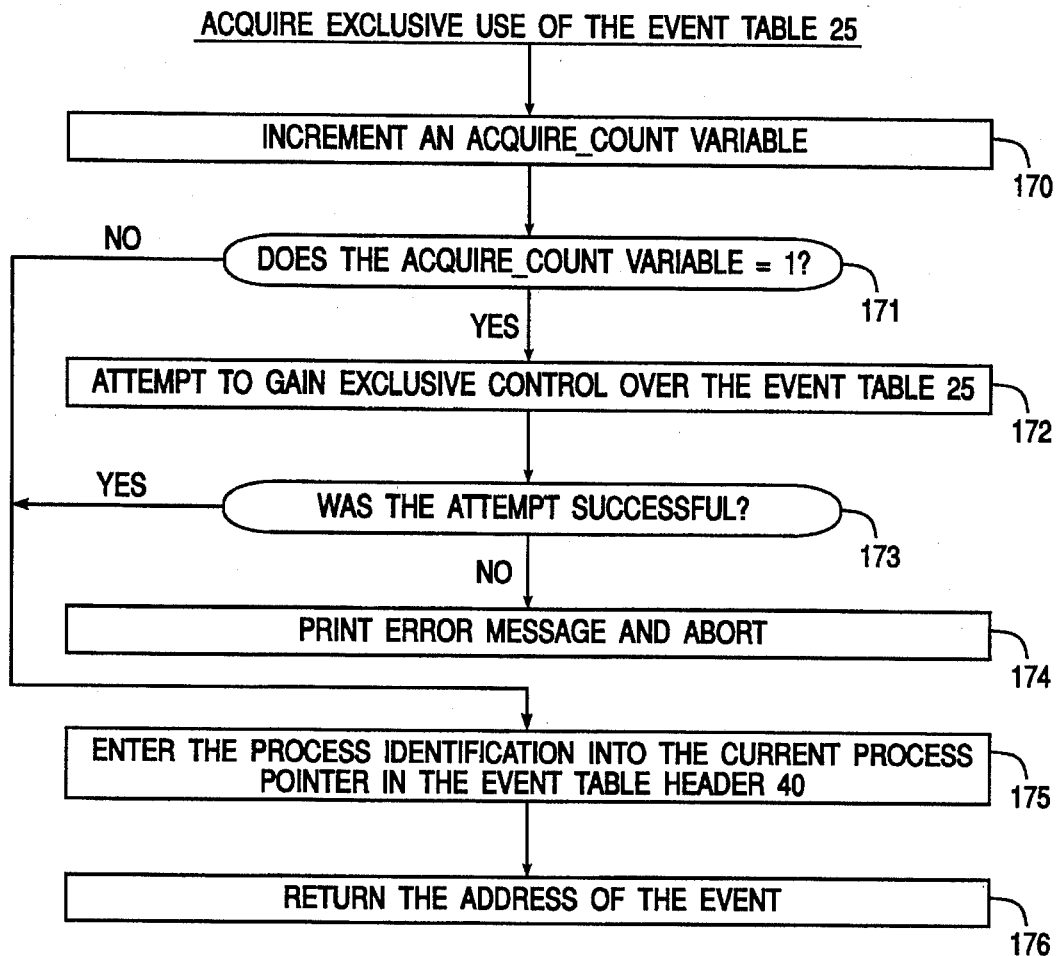
FIG. 11 depicts further detailed steps the event manager uses during the initializing procedure of FIGS. 9A and 9B and during other procedures for acquiring exclusive control of the event table of FIG. 2.

FIG. 11 discloses the sequence for acquiring exclusive control in more detail. When the initializing sequence in FIG. 10 calls this acquisition sequence in step 167, the event manager 24 increments the acquire_count variable (step 170) that normally will have a zero value. If the incremented value of the acquire_count variable equals 1, no other process has exclusive control, so the event manager 24 branches (step 171) and tries to assume exclusive control (step 172). Processes for acquiring exclusive control of shared memory are well known, so the details of this portion of the acquisition sequence are omitted from this description. If the attempt to gain control is not successful, the event manager 24 branches, (step 173) produces an error message and aborts further operations (step 174). If the acquire_count variable is greater than 1, the process already has exclusive control, so the event manager 24 branches from step 171 to step 175 to complete the sequence. Similarly, if an attempt to gain control is successful, the event manager 24 uses step 173 to branch to step 175. In step 175, the event manager 24 enters the current value of the EVENT_process variable into CURRENT PROCESS POINTER in the event table header 40 of FIG. 2. In step 176 the event manager 24 returns the address of the event table header 40 to the EVENT_header variable. Operations return to the controlling routine that now denies access to the shared memory to any other process.

c. Relinquishing exclusive control of the event table 25 (FIG. 12)

Figure 12:
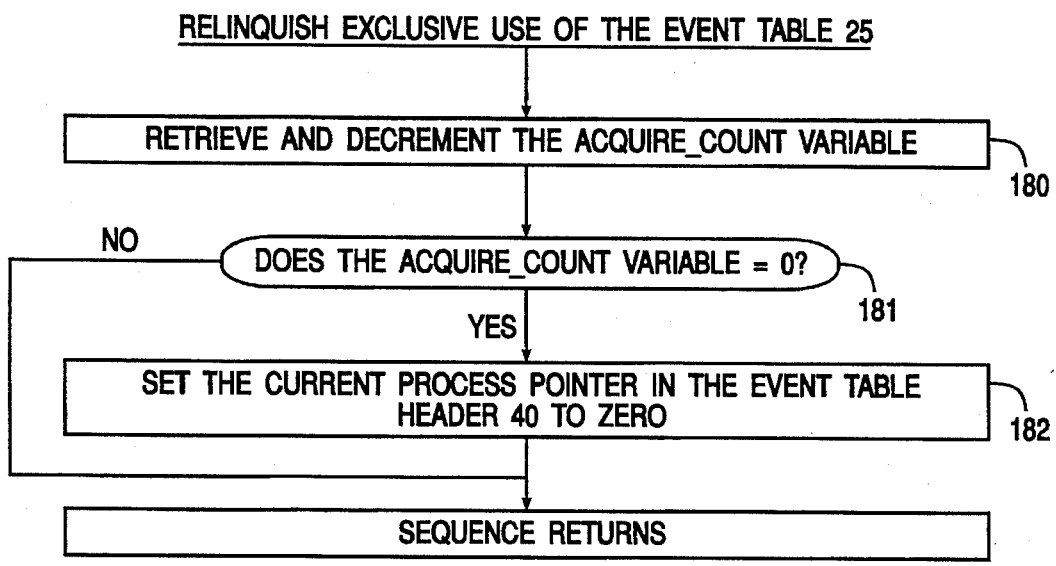
FIG. 12 depicts further detailed steps the event manager uses during the initializing procedure of FIGS. 9A and 9B and during other procedures for relinquishing exclusive control of the event table of FIG. 2.

When the event manager 24 completes the task that requires exclusive control over the event table, it relinquishes control using the sequence of FIG. 12. Specifically the event manager 24 retrieves the acquire_count variable set in FIG. 11 and decrements it (step 180). If the decremented value of the acquire_account variable is zero, the event manager 24 sets the current process pointer in the event table header 40 to a zero value. This indicates that no other process is using the event table 25. The event manager 24 also takes other actions can be to relinquish exclusive control. Processes for relinquishing exclusive control of shared memory, like the processes for acquiring exclusive control of shared memory, are well known, so the details of this portion of the relinquishing sequence are omitted from this description.

It is possible for a single process to request exclusive control multiple times in a nested fashion. When the most recent request ends, the decremented value of the acquire_count variable will have a value greater than 0. When the event manager 24 completes step 182 or when the acquire_variable is greater than zero, the event manager 24 returns operations return to the controlling routine, such as the initializing routine in FIG. 9A and 9B.

Referring again to FIG. 9A and 9B, after the event manager 24 acquires exclusive control of the event table 25 in step 167, it produces a new process block. First, the event manager 24 allocates a block of contiguous memory locations in the free memory of the event table 25 for the new process block (step 183) and inserts this new process block into the SRQ:PROCESS BLOCKS self-relative queue (step 184). The head of this queue is in the event table header 40. The event manager 24 now copies the address of this new process block into the EVENT_process variable and the CURRENT PROCESS POINTER in the event table header 40 in step 186. The process block is then initialized, so the event manager 24 relinquishes exclusive control over the event table in step 168. The sequence for forming a process block ends when the event manager 24 interacts with the database manager 23 to return the process identification to the event dependent process (step 187). Thus, when the sequence in FIG. 9A and 9B completes the operation of step 187, the event table has a process block corresponding to the event dependent process requesting the session and the event dependent process has the address of that process block in the event table 25.

Next the event manager 24 begins a sequence to establish a session block in the event table 25, such as the session block 44 in FIG. 2. After the event manager 24 acquires exclusive control of the event table (step 190), it retrieves the EVENT_process pointer (step 191). This step is redundant in the context of FIG. 9A except when an event dependent process beings a second session. Then the event manager 24 allocates another block of contiguous memory locations from the free memory in the event table 25 for a new session block (step 192). The process under which session runs is called a "parent process". The session block contains a pointer to that parent process, so the event manager 24 copies the EVENT_process variable into the PTR:PARENT PROCESS pointer of the new session block in step 193. Next the event manager 24 inserts the new session block into the SRQ:SESSIONS IN PROCESS self-relative queue associated with the parent process block (step 194). After the event manager 24 initializes the SRQ:OUTSTANDING REQUESTS self-relative queue in step 195, it sets an identification variable to the address of the newly formed session block (step 196) in FIG. 9B. Then the event manager 24 relinquishes exclusive control over the event table 25 in step 197 and returns the session identification through the operating system to the event dependent process.

Thus, when the sequence in FIG. 9B, and the sequences in FIGS. 10 through 12, finish, the event table 25 contains a process block and a session block for the event dependent process that requested the session. The event dependent process has the addresses of both of its corresponding process block and session block. As previously indicated, if an event dependent process requires a second session under a given process, the foregoing sequence in FIG. 9A and 9B will add a second session block under the corresponding process block.

Figure 13A:
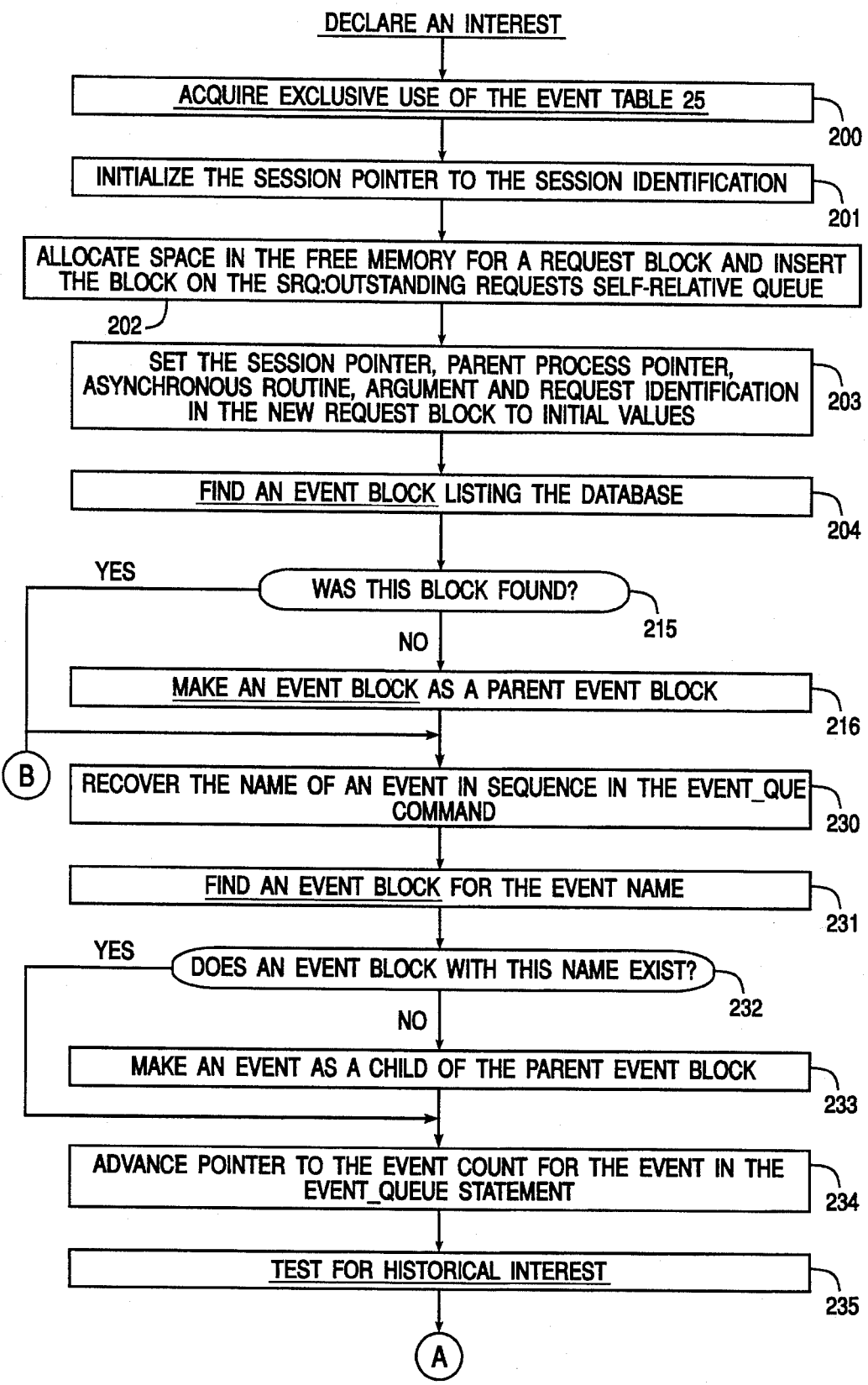
FIGS. 13A and 13B sets forth detailed steps of a declaration procedure the event manager uses when an event dependent process establishes a wait state as shown in FIG. 5.
Figure 13B:
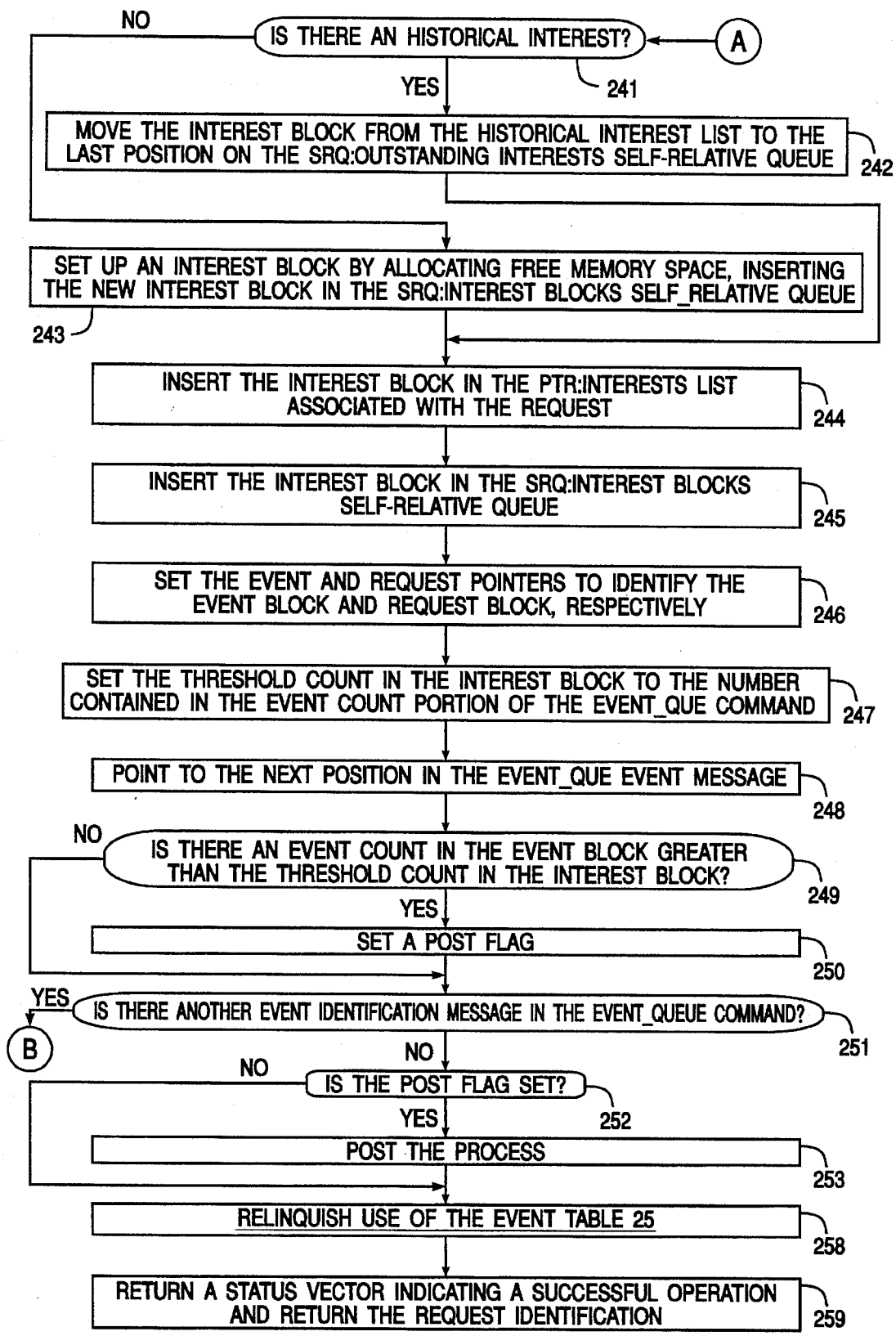

2. The declaration of an interest in an event by an event dependent process and the issue of a request to be notified (FIG.13A and 13B)

As described with respect to FIGS. 5 and 7, the EVENT_que command is an example of a command that declares an interest in an event. This command contains the location of a status vector, the session identification produced in accordance with FIG. 9A and 9B, a designation of the database and a list of the names of each event of interest to the event dependent process. The entry in the event list contains two components, namely: (1) a length byte and (2) an event name. The length byte identifies the number of characters in the event name. In the context of the commodities database, the auxiliary programs could declare an interest in soybeans and pork bellies by issuing a command in the form:

EVENT_que(status_vector,session_id,commodities-.gdb, 8,soybeans,xxxx,11,porkbellies,yyyy)

where "xxxx" is the event count for soybeans and "yyyy" is the event count for pork bellies.

When the auxiliary programs issue this command in response to the "event_init" command in FIG. 3 and the "isc_wait-for_event" command in step 105 of FIG. 5, the event counts are zero. When the auxiliary programs produce the EVENT_queue command in response to step 111 in FIG. 5, each event count may or may not have a zero value, as described later. The event manager 24 initiates the same sequence of operations, as shown in FIGS. 13A and 13B, to interpret and execute the EVENT_queue command.

As previously described, the "isc_wait_for_event" command causes the event dependent process to enter a synchronous wait state. The event manager 24 provides asynchronous trap information in response to this command. If the event dependent process is to enter an asynchronous wait state, a command similar to the EVENT_queue command will issue and will include the appropriate asynchronous trap information. The sequence in FIGS. 13A and 13B is essentially the same for both commands.

It will be helpful to discuss two additional concepts that are important to this invention. First, the database management system in FIG. 1 has the capability to operate multiple databases under the same database manager 23. In this environment, there is still only a single event manager 24 and event table 25. It is therefore possible that two or more databases may contain a field with the same name. In order to avoid any ambiguity, the event manager 24 produces two kinds of event blocks in the SRQ:EVENT BLOCKS self-relative queue. One type is a "parent event block"; the other, a "child event block". There is one parent event block for each database and it is identifiable because its PARENT NAME pointer has a null value. In the parent event block, the event count entry specifies the number of events in the database for which requests exist and the EVENT NAME entry contains the name of the database. Child event blocks contain the event name and the PTR:PARENT NAME pointer identifies the parent event block.

Second, whenever the event manager 24 transfers information to an event dependent process in response to a request, such as an EVENT_queue statement, the event manager 24 deletes the request from a request block 45. In many instances, the event dependent process incorporates such requests in loops. Thus, it can be anticipated that event dependent process will cause the same request to be issued again. In accordance with an aspect of this invention, the event manager 24 does not automatically delete interest blocks associated with a request (called "request interest blocks") when it deletes a request. Rather, the event manager 24 determines if a corresponding interest block is located in an historical list (called an "historical interest block"). This is a linked list and the PTR:HISTORICAL INTERESTS entry of the parent session block points to the first interest block on this historical list. If a corresponding historical interest block is located, the request interest block can be deleted. Otherwise the request interest block is transferred to the historical list. The use of an historical list minimizes processing associated with any subsequent reissue of a request and also maintains maximum free memory space in the event table 25.

Now referring to FIG. 13A, the event manager responds to an EVENT_queue statement initially by acquiring exclusive use of the event table (step 200) in accordance with the sequence of FIG. 11 and by initializing a session pointer (step 201) with the session identification supplied by the event dependent process. Next the event manager 24 allocates space in free memory of the event table 25 for a request block and inserts the new block on the SRQ:OUTSTANDING REQUESTS self-relative queue for the parent session (step 202). The event manager 24 sets the PTR:PARENT PROCESS pointer with the EVENT_process variable and the PTR:PARENT SESSION pointer with the session identification, inserts asynchronous trap information into the ASYNCHRONOUS TRAP ROUTINE and ARGUMENT FOR ASYNCHRONOUS TRAP ROUTINE entries. The asynchronous trap information may be supplied directly from the event manager 24 or from the event dependent process, as previously described. The event manager 24 provides a request identification number in the REQUEST IDENTIFICATION entry by incrementing the REQUEST IDENTIFICATION section of the event table header 40. Each request, regardless of its source or the relevant database, obtains a number in numerical sequence. Next the event manager 24 tries to find a parent event block (step 204) in the SRQ:EVENT BLOCKS self-relative queue.

a. Find an event block (FIG. 14)

Figure 14:
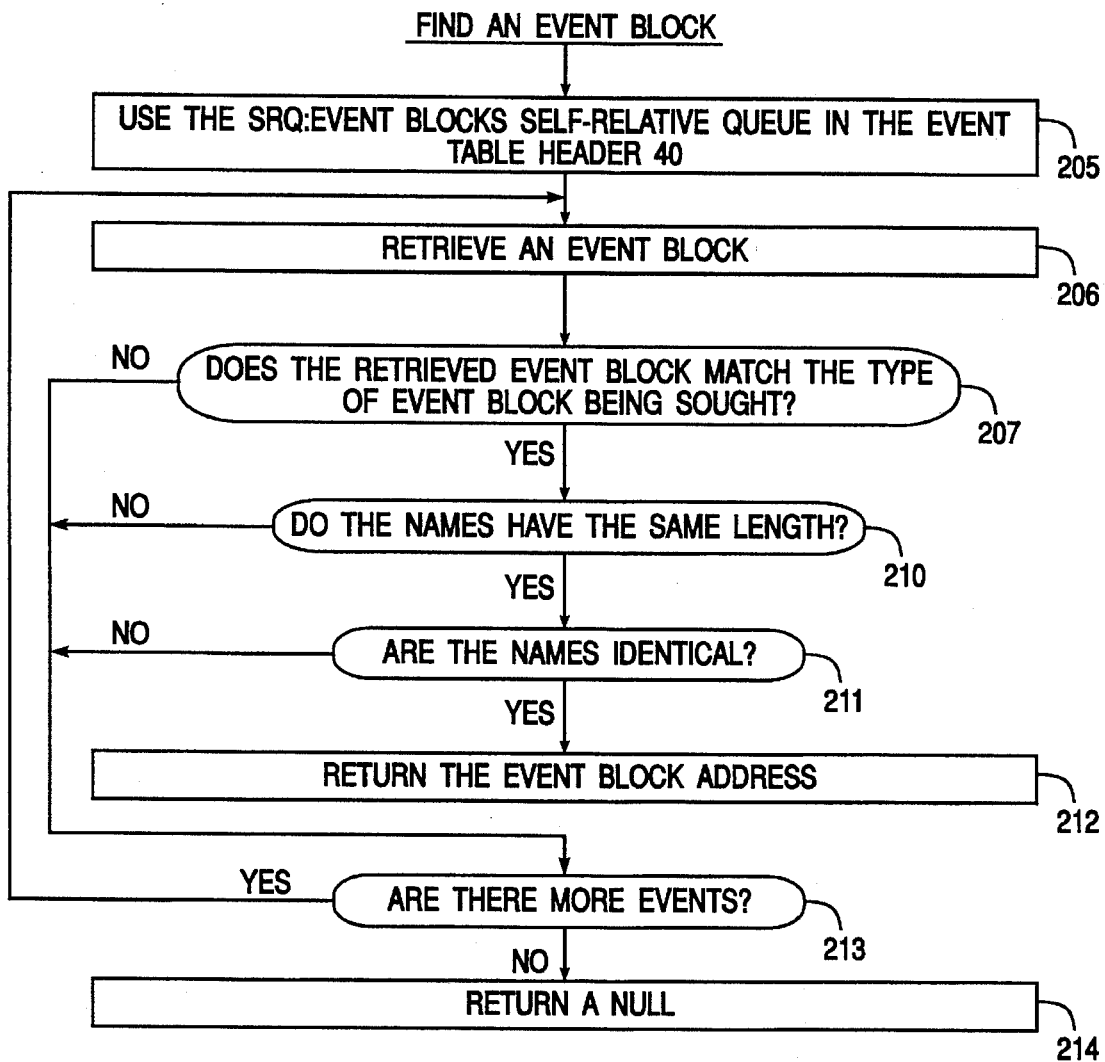
FIG. 14 depicts further detailed steps the event manager uses during the declaration procedure as shown in FIGS. 13A and 13B and during other procedures for finding an event block in the event table of FIG. 2.

This function is provided by a series of steps shown in FIG. 14 in which the event manager 24 uses the SRQ:EVENT BLOCKS self-relative queue in the event table header 40 to identify a first event block in the event block queue (step 205). Then the event manager 24 retrieves that event block (step 206) and determines whether it is a parent or child event block by examining the contents of the PTR:PARENT NAME pointer. In the context of step 204 in FIG. 13A, this sequence is to find a parent event block, so if the PTR:PARENT NAME pointer has a null value, the event manager 24 branches in step 207 to conduct other tests. For example, the event manager determines if the name in the request (i.e., the database name) and the name in the EVENT NAME entry have the same number of characters in step 210. If they do, the event manager 24 performs a string comparison of the two names in step 211. If all these tests are passed, the event manager has the appropriate parent event block and returns the address of that parent event block as a "parent" variable. If the selected event block fails to pass a test, the event manager 24 continues through the EVENT BLOCKS queue (step 213) until the appropriate parent event block is found. If no parent event block is found, the event manager returns a null (step 214) in the parent variable.

Referring again to FIG. 13A, the event manager 24 tests the value in the parent variable (step 215). If the parent variable has a null value, no parent event block was found and the event manager uses step 216 to make a parent event block. Otherwise, the event manager 24 branches to begin processing the contents of the EVENT_queue command.

b. Making an event block (FIG. 15)

Figure 15:
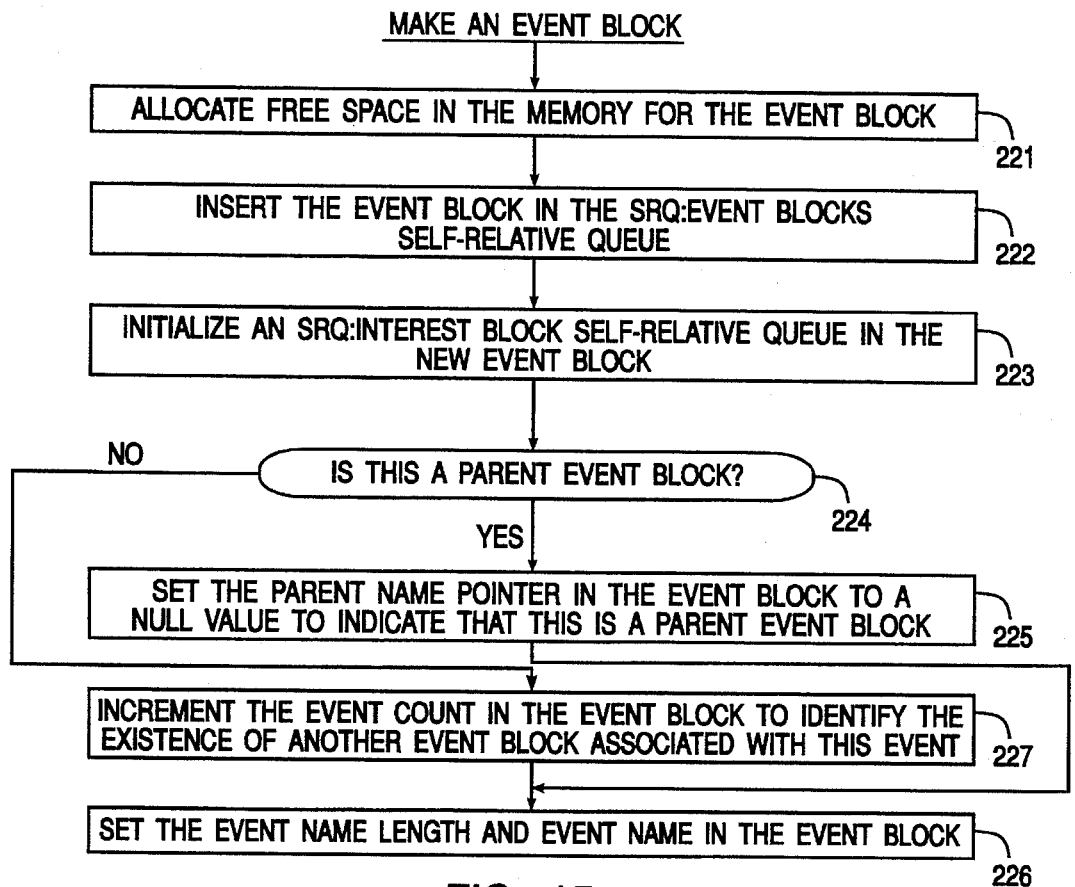
FIG. 15 depicts further detailed steps the event manager uses during the declaration procedure as shown in FIGS. 13A and 13B and during other procedures for making an event block in the event table of FIG. 2.

When the event manager 24 requires a new event block, it uses the steps in FIG. 15. This sequence can be used to form both parent and child event blocks, depending upon the context in which the sequence is called.

As a first step in forming an event block of either type, the event manager 24 allocates free memory space in the event table 25 for the new event block (step 221) and inserts the new event block into the SRQ:EVENT BLOCKS self-relative queue (step 222). The head of this queue appears in the event table header 40. The event manager 24 also initializes an SRQ:INTEREST BLOCKS self-relative queue for interest blocks initialized in the new event block (step 223) into which various interest blocks will be inserted.

When the event manager 24 forms a parent event block as in response to step 216 in FIG. 13A, it branches from step 224 to step 225 to set the PTR:PARENT NAME pointer to a null value. Then it transfers the database name to the EVENT NAME entry and the length of the database name to the EVENT NAME LENGTH entry (step 226). If the event manager 24 is making a child event block, it branches from step 224 to step 227 to increment the EVENT COUNT entry in the associated parent event block and then transfers to step 226 to insert the event name and length in the corresponding EVENT NAME and EVENT NAME LENGTH entries.

Thus, when the sequence of FIG. 15 finishes in the context of its call from step 216 in FIG. 13A, the event table 25 contains a parent event block for the database and it contains a zero value in its EVENT COUNT entry. In the contents of the commodities database, the EVENT NAME LENGTH is 10 and the EVENT NAME is "commodities.gdb". If the database name includes other identifying information, it will be included and the EVENT NAME LENGTH will be increased accordingly. Now the event manager 24 returns control to step 230 in FIG. 13A.

Referring to FIG. 13, the event manager 24 uses step 230 as in initial step in an iterative sequence that recovers each event name in the EVENT_queue statement and then uses steps 231 through 233 to include a corresponding child event block in the event table 25. When the event manager 24 calls the sequence of FIG. 14 for finding an event block in step 231, it identifies the parent event block. Thus, the sequence will return the child event block address if the event block exists or a null value. If a null value is received, the sequence of FIG. 15 makes the appropriate child event block that includes the event name, a zero event count and the address of the parent event block.

In step 234, the event manager 24 advances a pointer used in the decoding the command to the event count portion of the event (step 223). In step 235 the event manager determines whether there already an interest block for this event name on the linked historical list.

c. Testing for historical interest blocks (FIG. 16)

Figure 16:
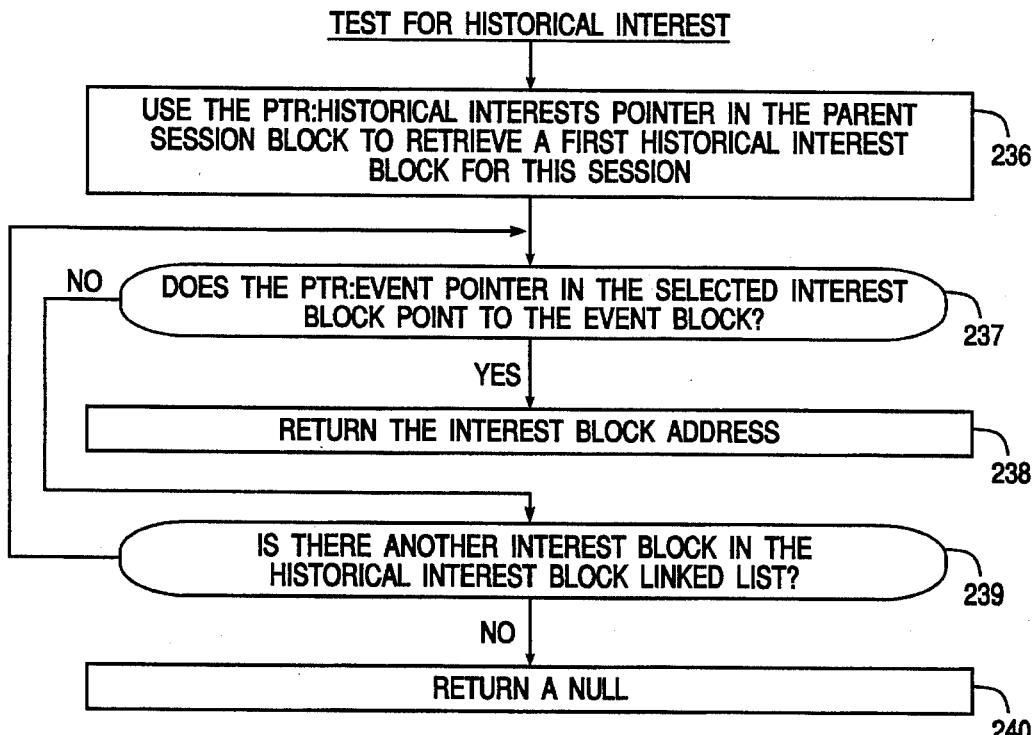
FIG. 16 depicts further detailed steps the event manager uses during the declaration procedure as shown in FIGS. 13A and 13B and other procedures for determining the status of a particular interest block in the event table of FIG. 2.

FIG. 16 discloses the test for historical interest. The event manager 24 utilizes the session identification retrieved from the process and the corresponding PTR:HISTORICAL INTERESTS entry in the parent session block for recovering each historical interest block, if any, in sequence. After recovering such an interest block in step 236, the event manager examines the PTR:EVENT pointer in the retrieved historical interest block. If that pointer specifies the same event block identified by steps 232 and 233 in FIG. 13, the event manager 24 branches at step 237 to return the interest block address in step 238. If the recovered interest block does not specify the event, the event manager 24 retrieves the next interest block (step 239) and tests this block for an event pointer in step 238. The process continues until either an interest block is found in the historical list or all the interest blocks on the list have been tested. If the entire list is exhausted without finding a corresponding interest block, the event manager terminates the test for historical interest by returning a null value in step 240.

Referring again to FIG. 13A, if the test for historical interest returns the address for an interest block, the event manager branches (step 241) to transfer the interest block from the historical interest list identified by the PTR:HISTORICAL INTERESTS entry in the parent session block to the SRQ:INTEREST BLOCKS entry for the corresponding event block in step 242. At the same time, the PTR:NEXT INTEREST entry in the interest block is set to zero.

If the test of step 241 in FIG. 13A indicates that no interest block exists, the event manager 24 uses step 243 to produce a new interest block. Specifically, the event manager 24 allocates a block of free memory space in the event table for the interest block. Then the event manager 24 inserts the new interest block in linked list of active interests identified by the PTR:INTERESTS pointer in the request block (step 244) and in the SRQ:INTEREST BLOCKS self-relative queue in the corresponding event block (step 245). If the linked list contains other interest blocks, the event manager 24 enters the address of the new interest block into the PTR:NEXT INTEREST pointer for the interest block that was the last block in the list and enters a zero value in the PTR:NEXT INTEREST pointer for the new interest block so it becomes the last block in the linked list. In addition, the event manager 24 inserts the address for the event block into the PTR:EVENT pointer of the new interest block and the address of the parent request into the PTR:PARENT REQUEST pointer (step 246) in FIG. 13B.

Next, the event manager 24 recovers the event count in the EVENT_queue command for the event name being processed and transfers this count to the THRESHOLD COUNT entry in the interest block (step 247). In step 248, the event manager 24 moves the pointer used in decoding the command past the event name that has just been processes. Then, in step 249, the event manager 24 compares the THRESHOLD COUNT entry in the new interest block with the EVENT COUNT entry in the event block that the PTR:EVENT pointer in that interest block identifies.

When the event manager 24 processes the sequence of FIG. 13B in response to an "event_init" statement in FIG. 3 and forms both a new event block and a new interest block, both the THRESHOLD COUNT entry in the new interest block and the EVENT COUNT entry in the corresponding event block will have a zero count because the entire sequence of FIG. 13B excludes any other process from accessing the event table 25. If the event block already existed or if the EVENT_queue command is issued in response to an "event_wait" statement as in FIG. 4, it may contain a non-zero count in its EVENT COUNT entry. If the event count is greater than the threshold count in the interest block, the event manager 24 will either branches from step 249 to set a post flag to TRUE in step 250 before determining whether the EVENT_queue command contains other event names. Otherwise, the event manager branches from step 249 directly to step 251.

The event manager points to the next position in the event queue message as set in step 248. If that decoding pointer is pointing at another event name, the event manager 24 branches back to step 230 to process the next event name. When all the event names have been processed, the event manager 24 uses step 252 to determine whether the post flag is TRUE. If it is, the event manager uses step 253 to post the process using the sequence of steps in FIG. 17.

c. Posting the process (FIG. 17)

Figure 17:
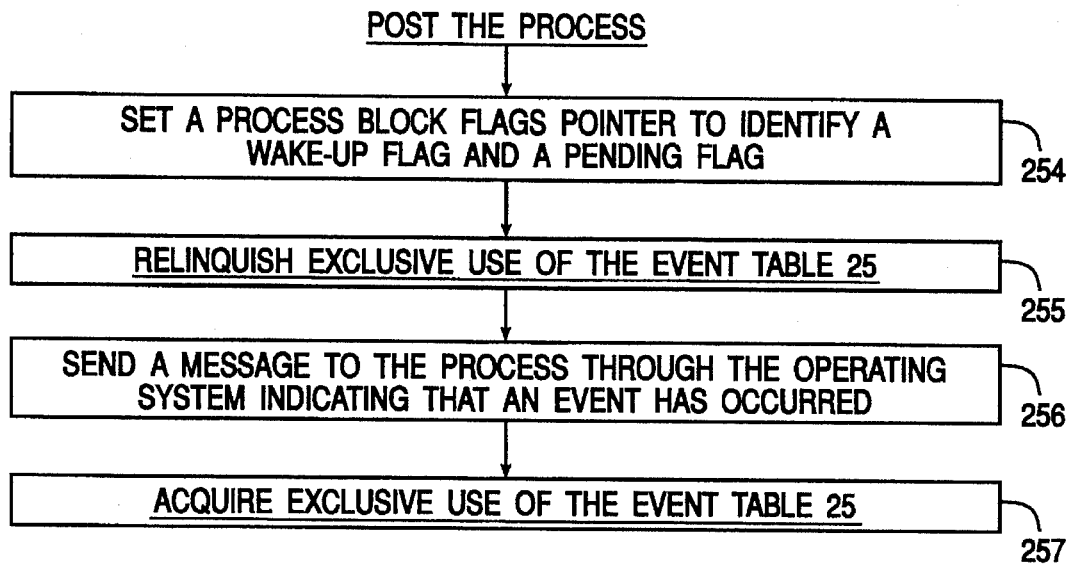
FIG. 17 depicts further detailed steps the event manager uses during the declaration procedure as shown in FIGS. 13A and 13B and during other procedures for notifying an event dependent process that an event has occurred.

FIG. 17 discloses the steps that the event manager 24 takes in posting a process. First, the event manager 24 sets appropriate flags in the FLAGS portion of the parent process block, particularly a wake-up flag and a pending flag (step 254). In step 255, the event manager 24 temporarily relinquishes exclusive use of the event table 25, using the sequence of FIG. 12, and causes the database manager 23 to send a message through the operating system to the event dependent process that the event has occurred (step 256). The event manager 24 immediately reacquires exclusive use of the event table in step 257 using the sequence of FIG. 11 and returns operations to step 258 in FIG. 13B.

Referring again to FIG. 13B, if all the foregoing operations occur without any post flag being set, the event manager 24 does not use the posting process in step 253. In either case, the event manager 24 ends the sequence of FIG. 13B by relinquishing exclusive use of the event table 25 in step 258 in accordance with the sequence of FIG. 12. Then the event manager 24 returns a status vector indicating successful operation and returns the request identification through the operating system to the event dependent process (step 259).

Thus, when the sequence of FIG. 13B ends, the event table 25 contains a request block based upon the decoded EVENT_queue command and one event block and one interest block for each event name contained in the EVENT_queue command. All of these blocks are at ascertainable locations in the event table 25. In addition, the event dependent process has received the request identification and is in a synchronous or asynchronous wait state.

3. The occurrence of an event and the notification of the event dependent process (FIGS. 18, 19A and 19B)

The particular database manager that implements this invention is a transaction driven database. It responds to certain statements within transaction definitions, such as statements for altering the database, in two discrete phases. As shown in FIG. 4, a transaction begins with a "START_transaction" statement. A USER A process in FIG. 1, for example, could issue a single transaction with a statement to change the price of soybeans. In the case of the USER A process, the statement following START_transaction statement would direct the price change for soybeans. During a first phase, the database manager 23 changes the database, but these changes are not visible to any other transaction. The database manager may also form one or more "deferred work blocks" in one or more lists during this phase. Each deferred work block has a header, a descriptor and a pointer to a next deferred work block in the list plus other information. The second phase begins when the database manager 23 processes a "commit" statement. The database manager 23 responds to the "commit" statement by making all the changes in the database visible to other processes. It also utilizes the deferred work block lists to take other actions as the deferred work block lists define.

As previously described, the process shown in FIG. 3 defines a particular type of trigger, called a "post event trigger". Although "post event triggers" are new, other types of triggers are known and utilized in prior systems of the assignee of this invention. These triggers are also classified as either preoperation or post operation triggers. A post event trigger is a post operation trigger. Whenever a post event trigger operates, it produces a "post event" deferred work block that contains, as additional information, the event name and the length of that event name.

Figure 18:
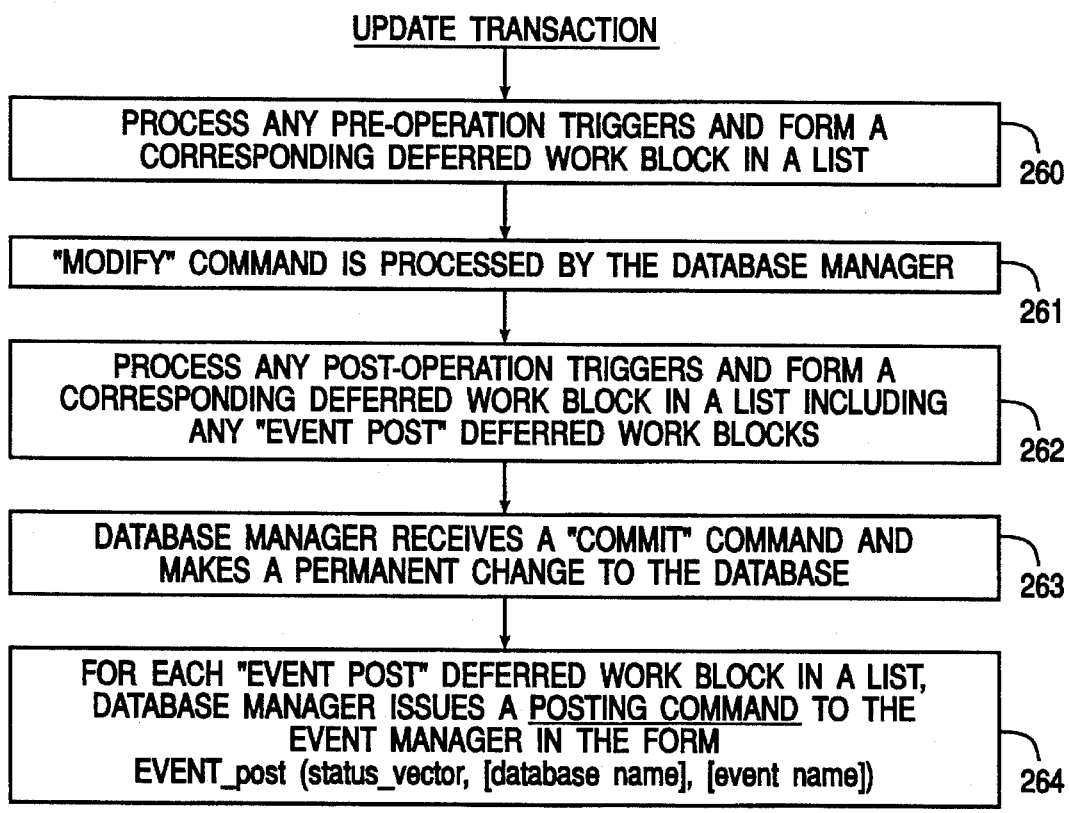
FIG. 18 depicts a procedure that occurs each time a process, such as the process for modifying the database of FIG. 1, modifies the database.
Figure 19A:
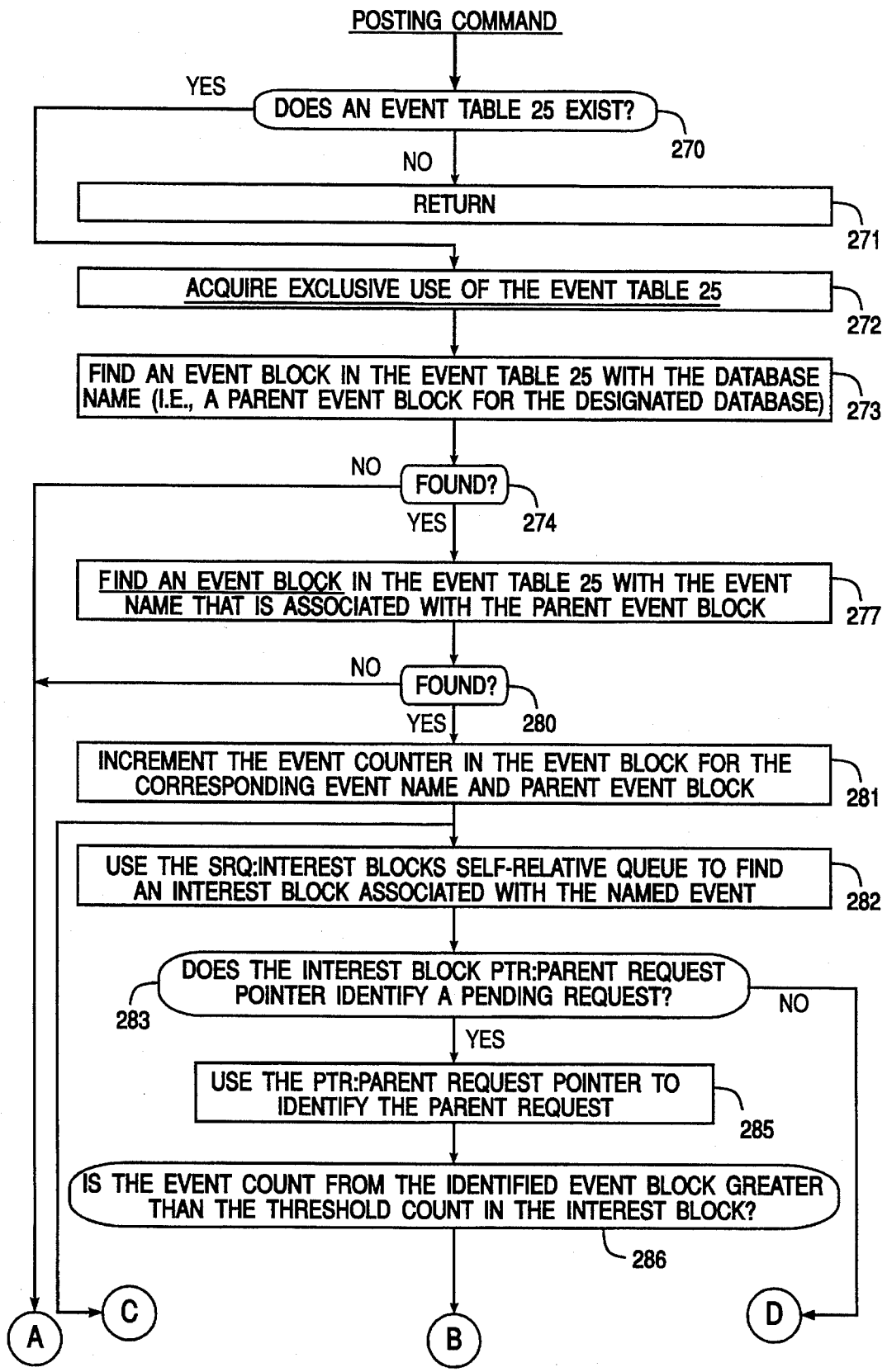
FIGS. 19A and 19B sets forth detailed steps of a notification procedure the event manager uses for notifying an event dependent process in response to the procedure described in FIG. 18.
Figure 19B:
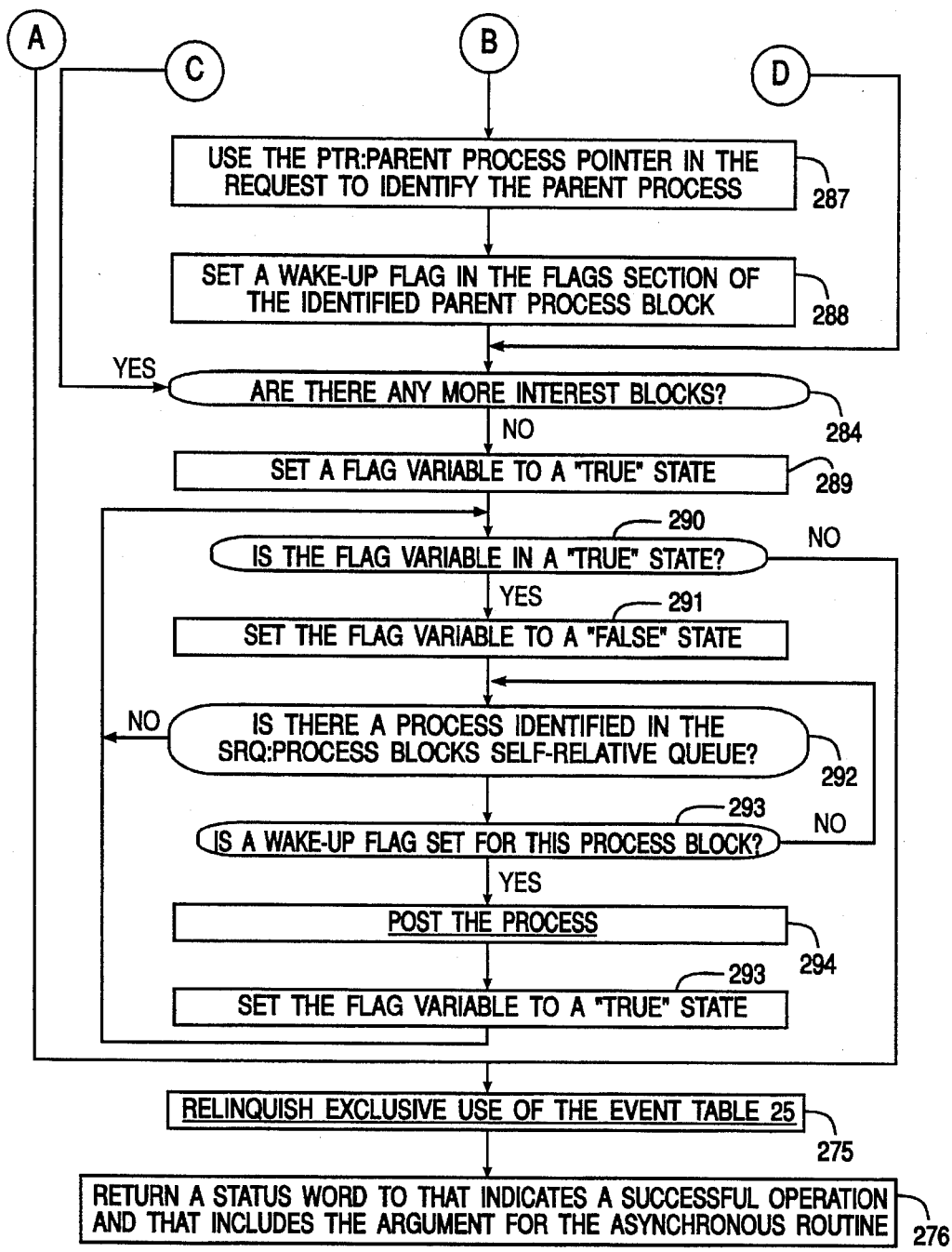

FIG. 18 discloses the steps by which the database manager 23 processes an "UPDATE" transaction that will alter, delete or add one or more fields to one or more records in the database. During the first processing phase the database manager 23 processes preoperation triggers and forms a corresponding deferred work block list in step 260. Next the database manager 24 processes the modify or update statement in step 261 and modifies the database records as directed. In step 262 the database manager processes any post operation triggers and again forms corresponding deferred work block lists, including an "event post" deferred work block list that records changes in the database that meet any condition established by any post event trigger. It should be noted, that a database may contain more than one post event trigger.

When the database manager 23 executes the commit statement (step 263), it makes permanent changes to the database and, with appropriate timing, issues an EVENT_post command for each deferred work block in a post event deferred work block list. As shown in FIG. 18 the EVENT_post command contains three basic arguments, namely: a status vector, an explicit identification of the database and an event name having the general form of a name length byte and the event name in succession as recorded in the corresponding deferred work block.

FIGS. 19A and 19B discloses a posting command sequence for the event manager 24. Initially the event manager 24 determines if an event table exists (step 270). If it does not, the event manager 24 issues an error message and terminates operations (step 271). Otherwise the event manager 24 acquires exclusive use of the event table 25 in step 272 according to the sequence of FIG. 11.

The event manager 24 then utilizes the database name in the EVENT_post command to find a corresponding parent event block in the SRQ:EVENT BLOCKS self-relative queue in step 273 using the sequence of FIG. 14. If no such parent block is found, there are no pending requests for the database, so the event manager 24 branches in step 274 to relinquish exclusive use of the event table (step 275) and to return an appropriate status word that indicates a successful operation (step 276).

If the database manager finds the parent event block in step 273, it branches at step 274 to find an associated child event block that contains the event name recovered from the EVENT_queue command. Step 277 again calls the procedure shown in FIG. 14. If no child event block is found, there is no interest in that event, so the event manager 24 branches from step 280 to step 275 to relinquish exclusive use of the event table 25 and return an appropriate status word.

If both a parent and child event block are found, the event manager 24 increments the EVENT COUNT entry of the child event block in step 281 and then, in step 282, uses the SRQ:INTEREST BLOCKS self-relative queue in the selected child event block to identify each interest block associated with that named event.

When the event manager 24 retrieves an interest block from the SRQ:INTEREST BLOCKS self-relative queue, it examines the PTR:PARENT REQUEST pointer in that interest block to determine whether the interest block is on an historical interest list or an active interest list. If there is no pending request, the event manager 24 branches from step 283 to step 284 to retrieve another interest block on the PTR:INTEREST BLOCKS self-relative queue. When the PTR:PARENT REQUEST pointer in the retrieved interest block identifies a parent request, the event manager 24 notes the address of the parent request block (step 285) and then tests the THRESHOLD COUNT entry in the interest block and the EVENT COUNT entry in the child event block. If the EVENT COUNT entry is not greater, step 286 causes the event manager 24 to transfer to step 284 to determine if more interest blocks exist. When the EVENT COUNT is greater, the event manager 24 uses the PTR:PARENT PROCESS pointer in the identified request block to specify a corresponding parent process block (step 287) and to set a wake-up flag in the FLAGS section of the identified parent process block (step 288).

After all the interest blocks associated with a given child event block are processed with the sequence beginning with step 282 and ending with step 288, the system branches from step 284 to step 289 to being a sequence for setting up a notification to all processes that events of interest have occurred. In step 289, the event manager 24 sets a flag variable to a "TRUE" state as in initial value and enters a loop to monitor each process block. Step 290 monitors the state of the flag variable to control the loop. If the flag variable is TRUE, the event manager 24 immediately sets the flag variable to "FALSE" as a default value.

The event manager 24 then uses the SRQ:PROCESS BLOCKS self-relative queue to interrogate each process block. If a process block is found in step 292 and its wake-up flag is set, step 293 enables the event manager to post the process in step 294, using the sequence of FIG. 17. Then the event manager 24 sets the flag variable to a "TRUE" state and returns to step 290. If the wake-up flag is not set, the event manager 24 transfers from step 293 back to step 292 to test another process block. When the event manager 24 has examined all process blocks, step 292 transfer control to step 290 and the flag variable will be set to a "FALSE" state, so the event manager 24 will transfer to step. 275 to complete the sequence.

Thus, the sequence in FIGS. 19A and 19B is invoked by each EVENT_post command produced by a different post event deferred work block. After the database manager 23 processes a "commit" statement, therefore, the event manager runs the sequence of FIG. 19 on an interactive basis until all the events in the post event deferred work block list are processed. Moreover, each process which has identified an interest in a particular event has been notified if an event trigger has produced an event change as defined by any EVENT_queue command from that process.

Figure 20:
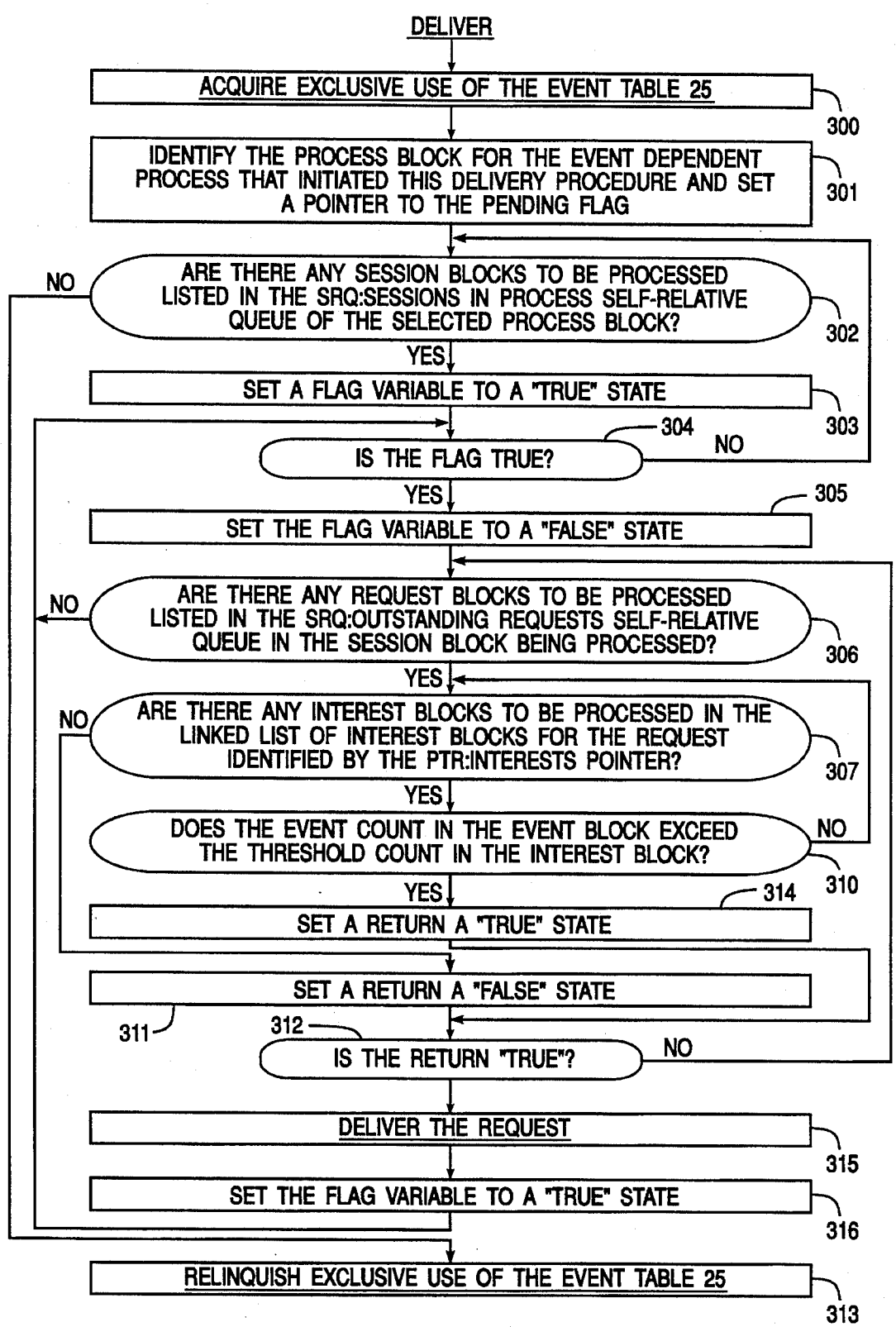
FIG. 20 sets forth detailed steps of a transfer procedure the event manager uses for transferring information concerning an event to an event dependent process in accordance with the procedure of FIG. 5.

4. The delivery of pertinent information concerning an event to the event dependent process (FIG. 20).

As described with respect to FIG. 5, after the event occurs, such as in step 113, the operating system "wakes up" the event dependent process. In this particular example, the operating system allows the event dependent process to continue. In another implementation, the "wake-up" process might signal the event and cause other procedures to stop or interrupt so the event dependent process can obtain information about the event. In either case, the process will send a statement or command to the event manager that initiates the DELIVER process of FIG. 20 and that identifies the event dependent process to the event manager.

After the event manager 24 obtains exclusive use of the event table (step 300) using the sequence of FIG. 11, it identifies the relevant process block and the appropriate flags in that process block (step 301). The event manager 24 uses the SRQ:SESSIONS IN PROCESS self-relative queue in the selected process block to identify a first session associated with the process (step 302). If there is a session block to process, the event manager 24 sets the flag variable to an initial "TRUE" state (step 303) for control purposes and immediately tests the flag variable in set 304. If the flag variable is "TRUE", the event manager 24 immediately sets the flag variable to a "FALSE" state and then begins a systematic search of each request in the session and each interest in each request to construct a buffer that contains all the requested event information.

During this search, the event manager 24 uses the SRQ:OUTSTANDING REQUESTS self-relative queue to retrieve a request block in step 306. If a request block exists, the event manager 24 uses step 307 to retrieve a first interest block in the linked list identified by the PTR:INTERESTS pointer in the selected request block. Then the event manager 24 beings an iterative process of testing each count in the THRESHOLD COUNT entry for the selected interest block and the EVENT COUNT entry in the corresponding child event block identified by the PTR:EVENT entry in the selected interest block. If the child event block count is not greater than the interest block count, step 310 branches back to step 307 to obtain a next interest block. If all the interest blocks have threshold counts that equal the event counts in the corresponding event blocks, step 307 will branch to step 311 and set a "FALSE" return when the last interest block is tested. In step 312, the event manager 24 will branch back to step 306 to obtain a next request block and begin the analysis of each interest block associated with the new request block.

If all the request blocks are processed without finding an event count that exceeds a threshold count, step 306 will branch to step 304 after the last interest block in the last request block is analyzed. Step 302 then will branch back to step 302 to obtain another session block, if one exists. When all the session blocks have been examined, step 302 branches to step 313 whereupon the event manger 24 terminates further action by relinquishing exclusive use of the event table 25 under the sequence of FIG. 12.

Whenever the event manager 24 encounters an event count that is greater than the threshold count, step 310 branches to step 314 so the event manager 24 sets the return to a "TRUE" state. Whenever this occurs, the event manager 24 branches from step 312 to step 315 to invoke a sequence that delivers the information defined by a request to the event dependent process. When that delivery is completed, the event manager sets the flag variable to a "TRUE" state and returns to step 306 to obtain a next request. In essence, whenever the event manager 24 executes step 315, it forwards all information in the request back to the event dependent process, so there is no need to analyze any interest blocks in the linked list after an interest block upon which the event manager 24 bases a decision to invoke the sequence of step 316.

a. Deliver the request (FIG. 21)

Figure 21:
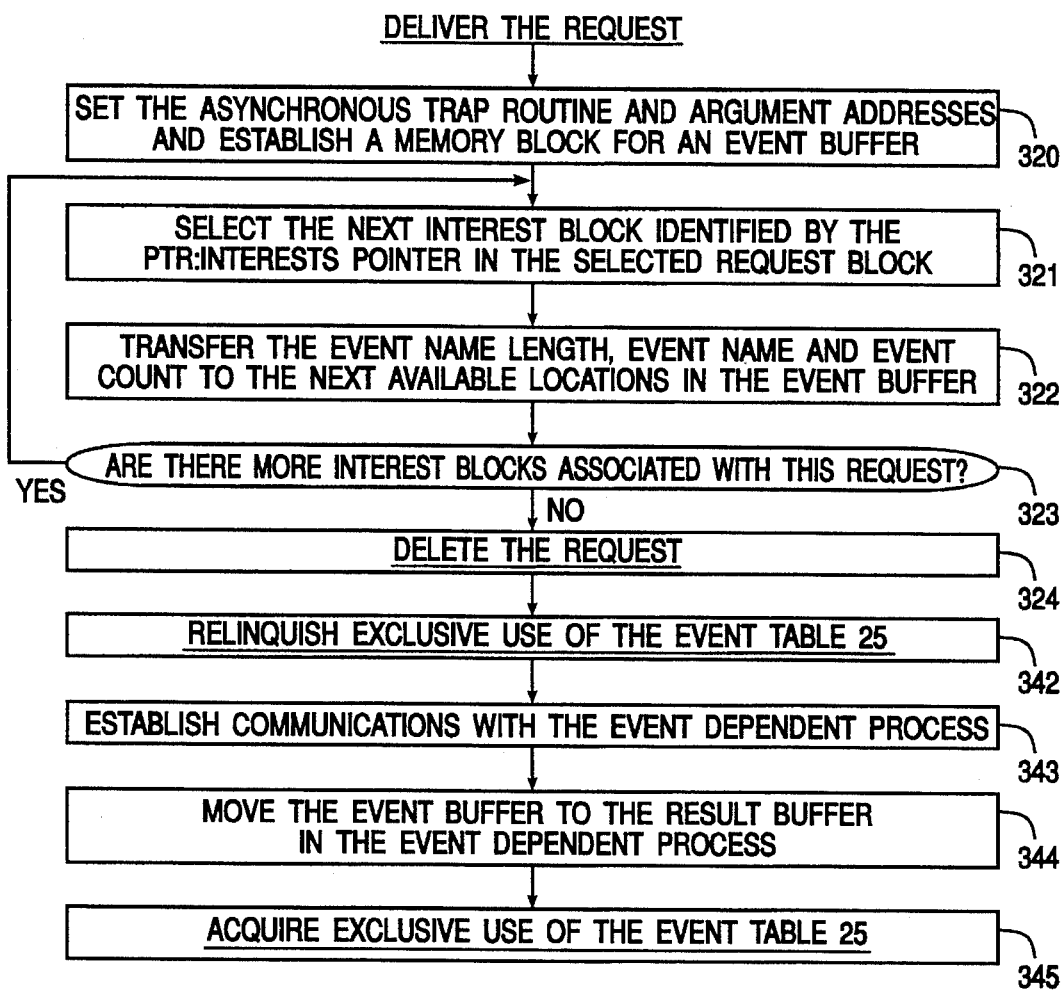
FIG. 21 depicts further detailed steps the event manager uses during the transferring procedure as shown in FIG. 20 for transferring information about an event to the event dependent process.

FIG. 21 discloses the steps by which the updated information related to a request transfers to the event dependent process. As an initial step, the event manager 24 sets the asynchronous trap routine and argument address and establishes a memory block that will constitute an event buffer (step 320). Then the event manager 24 enters an iterative process by which it selects each interest block associated with the request in sequence (step 321) and builds an event buffer by transferring the event name length, event name and event count to the next available locations in the event buffer (step 322). If more interest blocks are associated with the selected request block (step 323), the event manager 24 branches back to step 321 to continue building the event buffer. If, at the time this action occurs, the event count for soybeans is 125 and the event count for pork bellies is 515, the event buffer will have the following contents:

8-S-O-Y-B-E-A-N-S-0-1-2-5-11-P-O-R-K-B-E-L-L-I-E-S-0-5-1-5

Figure 22:
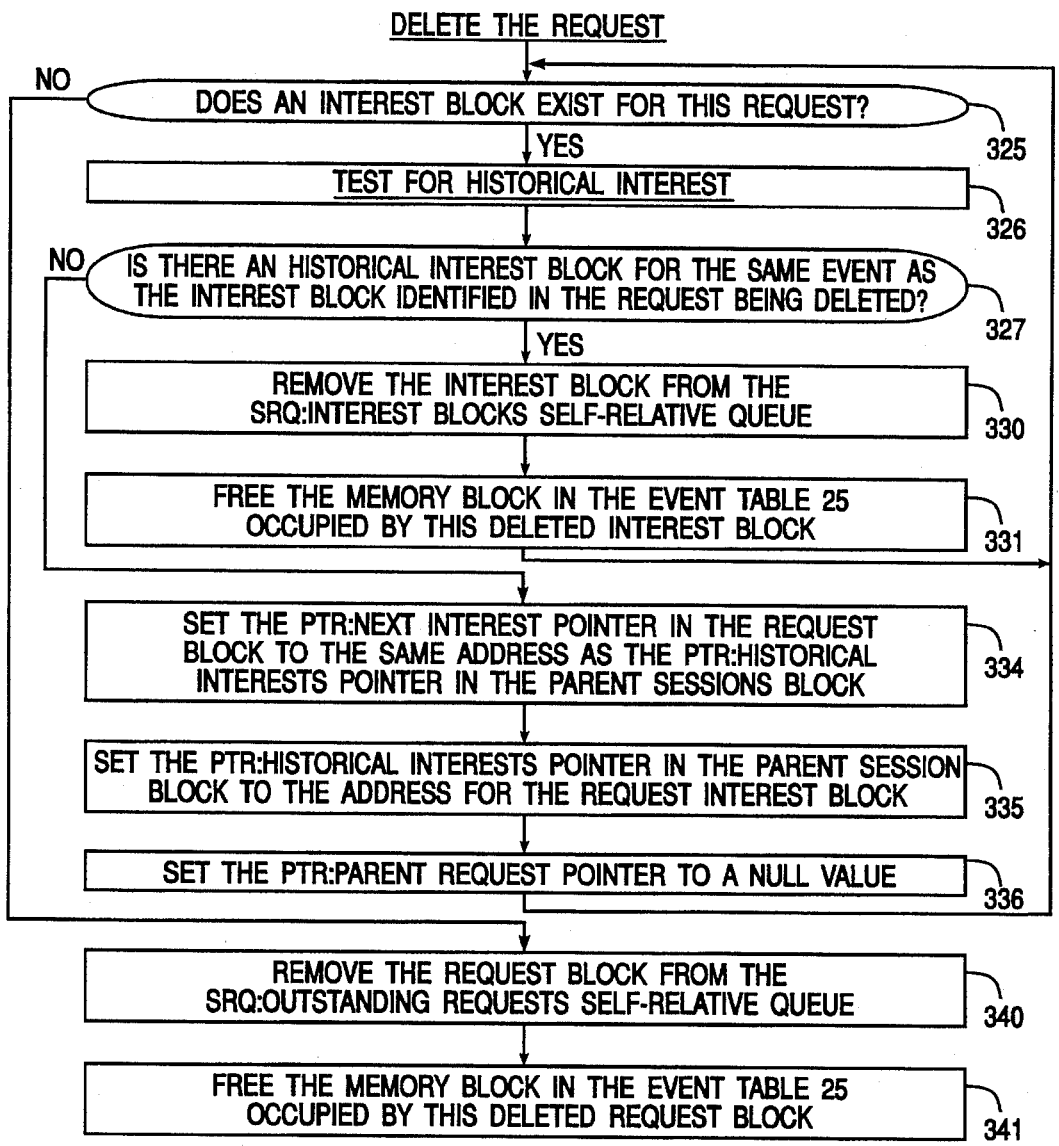
FIG. 22 depicts further detailed steps the event manager uses during the transferring procedure as shown in FIG. 20 and other procedures for deleting a request.

Once the event manager forms this event buffer, it can delete the request (step 324) as specifically disclosed in FIG. 22.

b. Deleting the Request (FIG, 22)

As previously indicated, it is important to use shared memory of the event table 25 should be used efficiently. One way to improve that use is to eliminate any redundant interest blocks. When a request is being deleted, the sequence of FIG. 22 examines each request interest block that is each interest block associated with the request. If that request interest block points and a corresponding interest block on the historical list point to the same child event block, it is possible to delete the request interest block. Otherwise, the request interest block is transferred to the linked list of historical interests as an historical interest block.

More specifically the event manager 24 establishes a loop (step 325) on each request interest block. In step 326 the event manager 24 utilizes the historical interest test of FIG. 16 to determine whether any interest block exists on the historical interest list that identifies the same event as the request interest block. If there is such an interest block on the historical interest list, the event manager 24 branches (step 327) to remove the request interest block from the SRQ:INTEREST BLOCKS self-relative queue and frees the memory block occupied by this deleted interest block (step 331). The event manager 24 tests another request interest block on the PTR:INTERESTS list.

If there is no interest block on the historical interest block list that identifies the same event as the active interest block, the event manager 24 transfers the active interest block to the linked list of historical interest blocks. Specifically, the event manager 24 sets the PTR:NEXT INTEREST pointer to the same address as the PTR:HISTORICAL INTERESTS pointer in the parent sessions block (step 334) and sets the PTR:HISTORICAL INTERESTS pointer to the parent sessions block to the address for the interest block (step 335) and sets the pointer in the interest block for the parent request to a null (step 336). The net result of these series of steps is to place what was a request interest block at the end of the historical interest block list. Again, the system returns to examine another request interest block (step 325).

Referring to FIG. 22, when all the interest blocks for the request have been eliminated or transferred, the event manager 24 removes the request block from the SRQ:OUTSTANDING REQUESTS self-relative queue (step 340) and frees the memory block in the event table occupied by the deleted request block (step 341).

Referring again to FIG. 21, when the event manager 24 completes step 324, the request is deleted and the event buffer has been formed. Now the event manager relinquishes exclusive use of the table 25 in step 342 according to the sequence in FIG. 12 and establishes communications with the event dependent process in step 343 to move the event buffer formed by steps 321 and 322 to the result buffer in the event dependent process during step 344. When this operation is completed, the event manager 24 again acquires exclusive use of the event table 25 in step 345 in accordance with the sequence of FIG. 11.

Referring to FIG. 20, the event manager 24 sets the flag variable to a "TRUE" state in step 316 and returns to analyze another request. Thus, when the event manager 24 relinquishes exclusive use of the event table 25 in step 313, it has examined each request in each session of the process and deleted all the requests and either removed request interest blocks from the event table 25 or transferred them to the linked list of historical interests.

Figure 23:
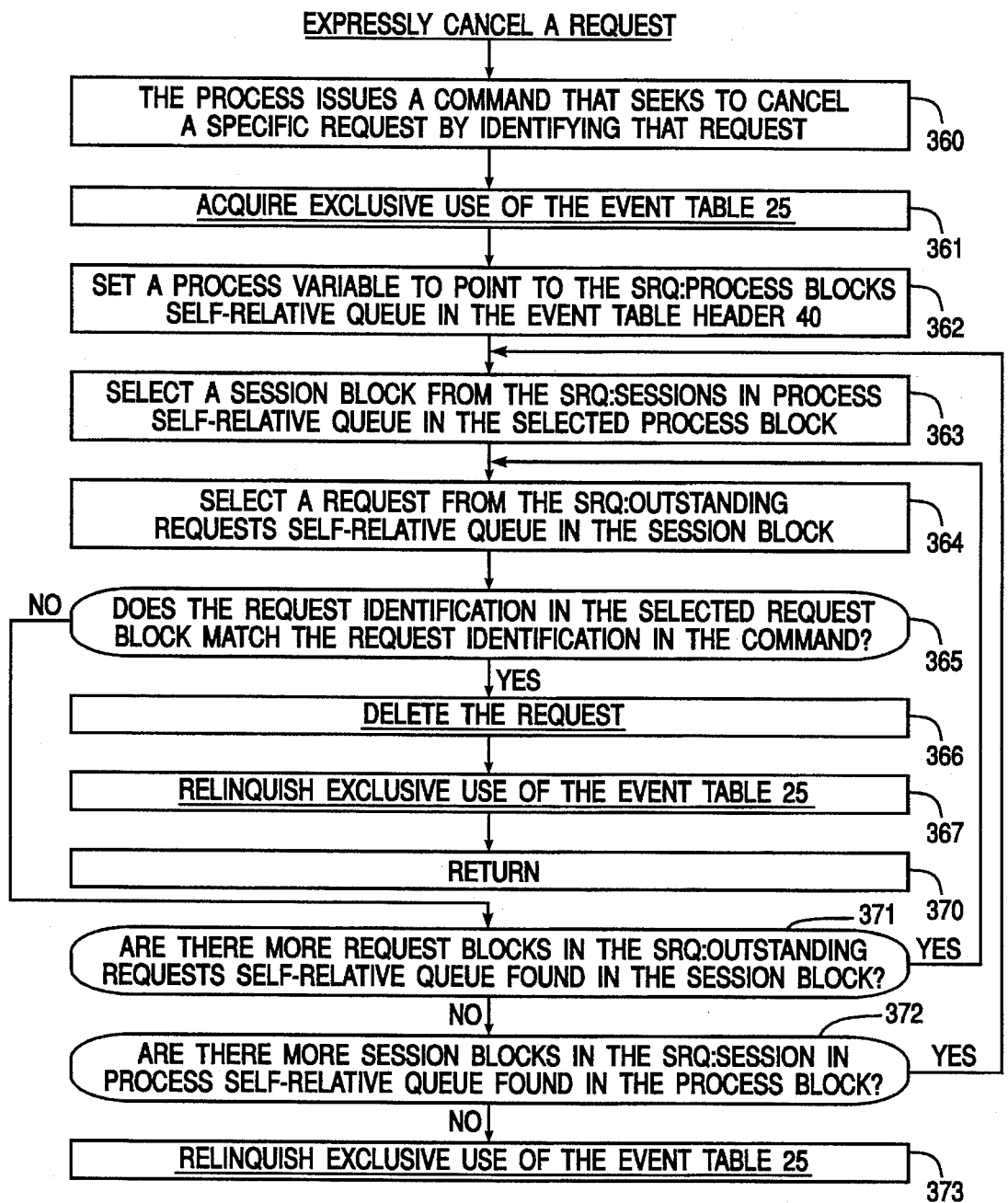
FIG. 23 sets forth detailed steps of a session deletion procedure the event manager uses when an event dependent process detaches from the database.

5. The deletion of a specific request in response to a command from the event dependent process (FIG. 23)

As previously indicated, each event dependent process contains a list of all its outstanding requests. It therefore is possible for the event dependent process to delete a pending request in the event table 25. The procedure for deleting such a specific request is set forth in FIG. 23. When the event dependent process transfers a command to cancel a request, it issues an EVENT_cancel command that includes a request identification number (step 360). The event manager 24 executes the EVENT_cancel command by acquiring exclusive use of the event table (step 361) in accordance with the sequence of FIG. 11 and sets the EVENT_process variable to identify the process block that contains the request to be deleted (step 362). Then the event manager 24 selects a session block from the SRQ:SESSIONS IN PROCESS queue in step 363 and examines each request block in the SRQ:OUTSTANDING REQUESTS self-relative queue. Specifically, the event manager 24 tests the request identification in the command against the REQUEST IDENTIFICATION entry in each request block. If a match is found, the event manager 24 branches through step 365 and deletes the request (step 366) using the procedures of FIG. 22. Immediately the event manager 24 relinquishes exclusive use of the event table (step 367) in accordance with FIG. 12 and returns (step 370). This return interrupts all the loops and completes the cancellation sequence.

If a selected request from the queue does not match the identification, additional request blocks are obtained in steps 371 and 364 and examined in step 365. If no match is found for a given session, the event manager 24 uses steps 371 and 372 to return the sequence to step 363 so all the requests in each and every session associated with a process are tested. If no match is found then the event manager 24 merely releases exclusive use of the event table (step 373). Normally, however, a request is identified and deleted along with all the interest blocks that do not have the same event identified in the historical interest block list.

Figure 24:
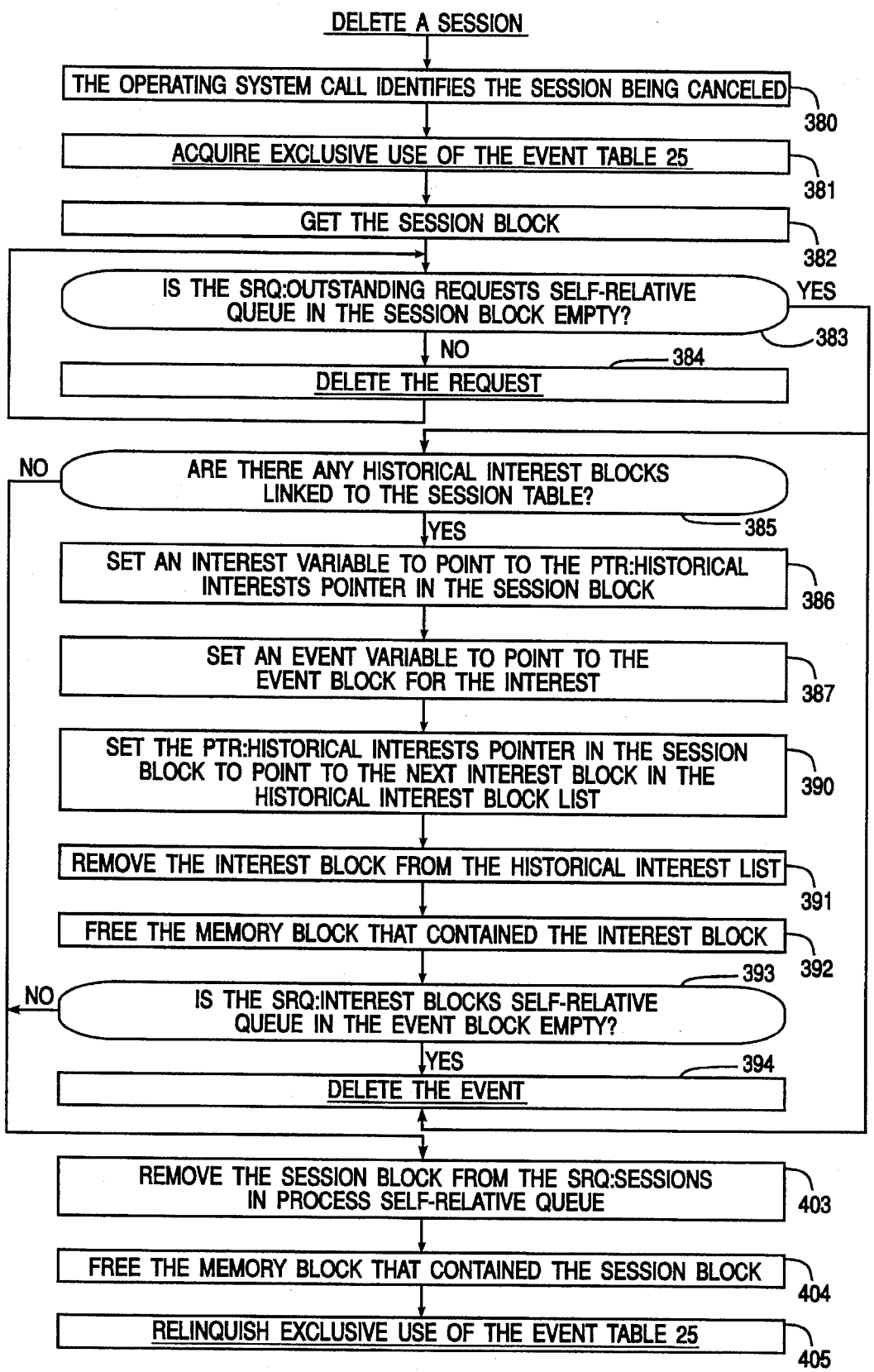
FIG. 24 depicts further detailed steps that the event manager uses during the session deletion procedure of FIG. 23 to remove a session block from the event table in FIG. 2.

6. The completion of the event dependent process with its detachment from the database (FIG. 24)

Whenever an event dependent process, or a session under that process, terminates, it is important to eliminate corresponding entries in the event table 25 thereby to make memory space available for other active processes. FIG. 24 discloses steps by which the event manger 24 responds such a session termination. Specifically the event manager 24 receives an EVENT_delete_session command that identifies the session being canceled (step 380). When this occurs, the event manager 24 acquires exclusive use of the event table (step 381) in accordance with the sequence of FIG. 11 and obtains the appropriate sessions block (step 382).

Next the event manager 24 enters a loop comprising steps 383 and 384 to delete all requests in the SRQ:OUTSTANDING REQUESTS self-relative queue for the selected session block using the procedure of FIG. 22. When all the requests identified by the session block are deleted, the event manager 24 determines if any interest blocks are associated with the PTR:HISTORICAL INTERESTS list in step 385. Specifically, the event manager 24 sets an interest variable to point to the historical interest block (step 386) and an event variable to point the event that the PTR:EVENT pointer in the interest block identifies (step 387). In step 390, the event manager 24 identifies the next interest block in the list and then removes the selected interest block from the historical interest list in step 391. The event manager 24 frees the memory block that contained that historical interest block (step 392). If the SRQ:INTEREST BLOCKS self-relative queue in the corresponding event block is not empty, the event manager 24 branches (step 393) to obtain another interest block in step 385. Whenever the event manager 24 determines that the SRQ:INTEREST BLOCKS self-relative queue is empty, the event manager 24 deletes the event (step 394) using the steps outlined in FIG. 25.

a. Delete the event (FIG. 25).

As previously discussed, there are two types of event blocks, namely a parent event block and a child event block. When the procedure of FIG. 24 determines in step (step 394) to delete an event, the event manager 24 removes that event from the SRQ:EVENT BLOCKS self-relative queue (step 395). Next the event manager 24 determines if the selected event block is a parent event block (step 396). In the context of deleting a session this typically will not be a parent event block, so the event manager 24 uses the PTR:PARENT NAME pointer in that event block (step 397) to decrement the event count in the parent event block (step 400). If the count does not equal zero, there are still events active in the event table 25 that are looking for events in the specified database for other processes, so the event manager 24 merely frees the memory block that contains the deleted child event block (step 402). If the count in the parent block is zero, step 401 calls the sequence of FIG. 25 (i.e., calls itself) and deletes the parent event block.

Figure 25:
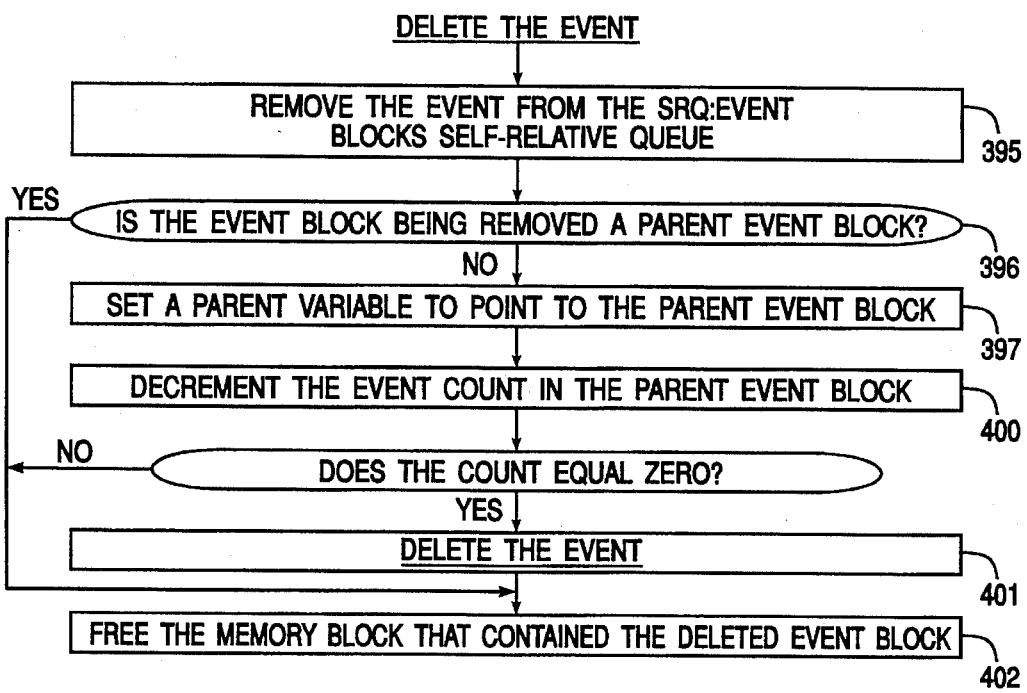
FIG. 25 depicts further detailed steps the event manager uses during the session deletion procedure of FIG. 23 to delete an event block from the event table in FIG. 2.

Thus, when the sequence of FIG. 25 ends, the child event block has been deleted and the space it occupied made available for other processes. If all the child event blocks associated with a particular database have been deleted, the parent event block itself also has been deleted.

Referring against to FIG. 24, after all the interest blocks on the historical interest linked list are deleted, step 385 in FIG. 24 shifts the event manager 24 to step 403 to remove the session block from the SRQ:SESSIONS IN PROCESS self-relative queue. Then the event manager 24 frees the memory occupied by that session block (step 404) and relinquishes exclusive use of the event table (step 405) in accordance with the sequence of FIG. 12.

Figure 26:
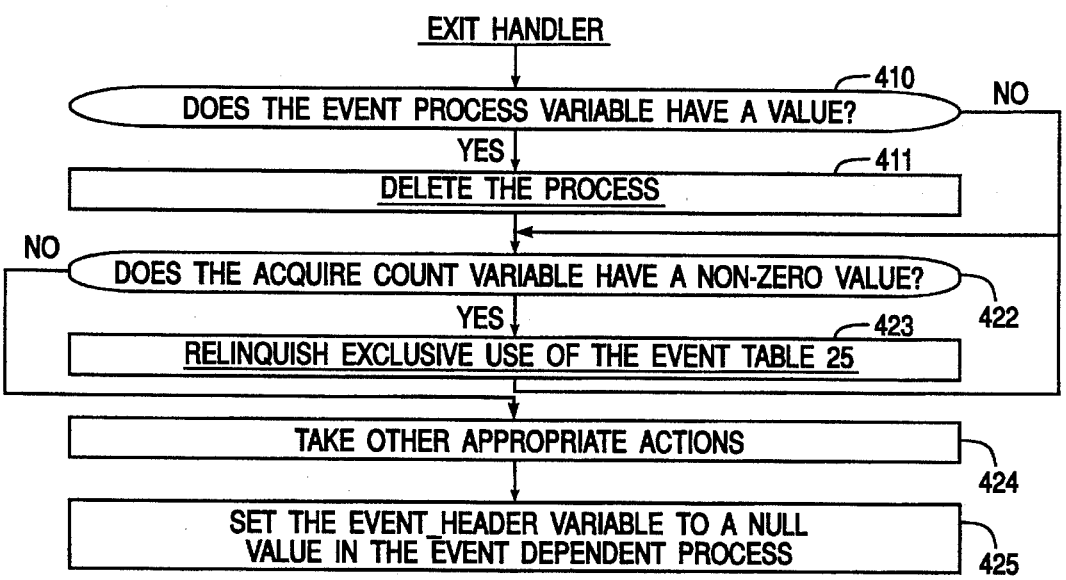
FIG. 26 sets forth detailed steps of a recovery procedure the event manager uses when an event dependent process unexpectedly detaches from the database.

7. The unexpected detachment of the event dependent process from the database (FIG. 26)

When the event manager 24 forms an event table during the sequence of FIG. 10, it establishes the procedures for terminating operations whenever the event dependent process unexpectedly detaches from the database in step 160 of that sequence. FIG. 26 discloses an exit handler that the event manager 24 utilizes whenever such an unexpected detachment occurs. The event manager 24 determines whether the EVENT_process variable exists (step 410). If an event dependent process has been interacting with the database system at the time of detachment, the EVENT_process variable will exist, and the event manager 24 then deletes the process (step 411) using the sequence of FIG. 27.

a. Delete the process (FIG. 27)

Figure 27:
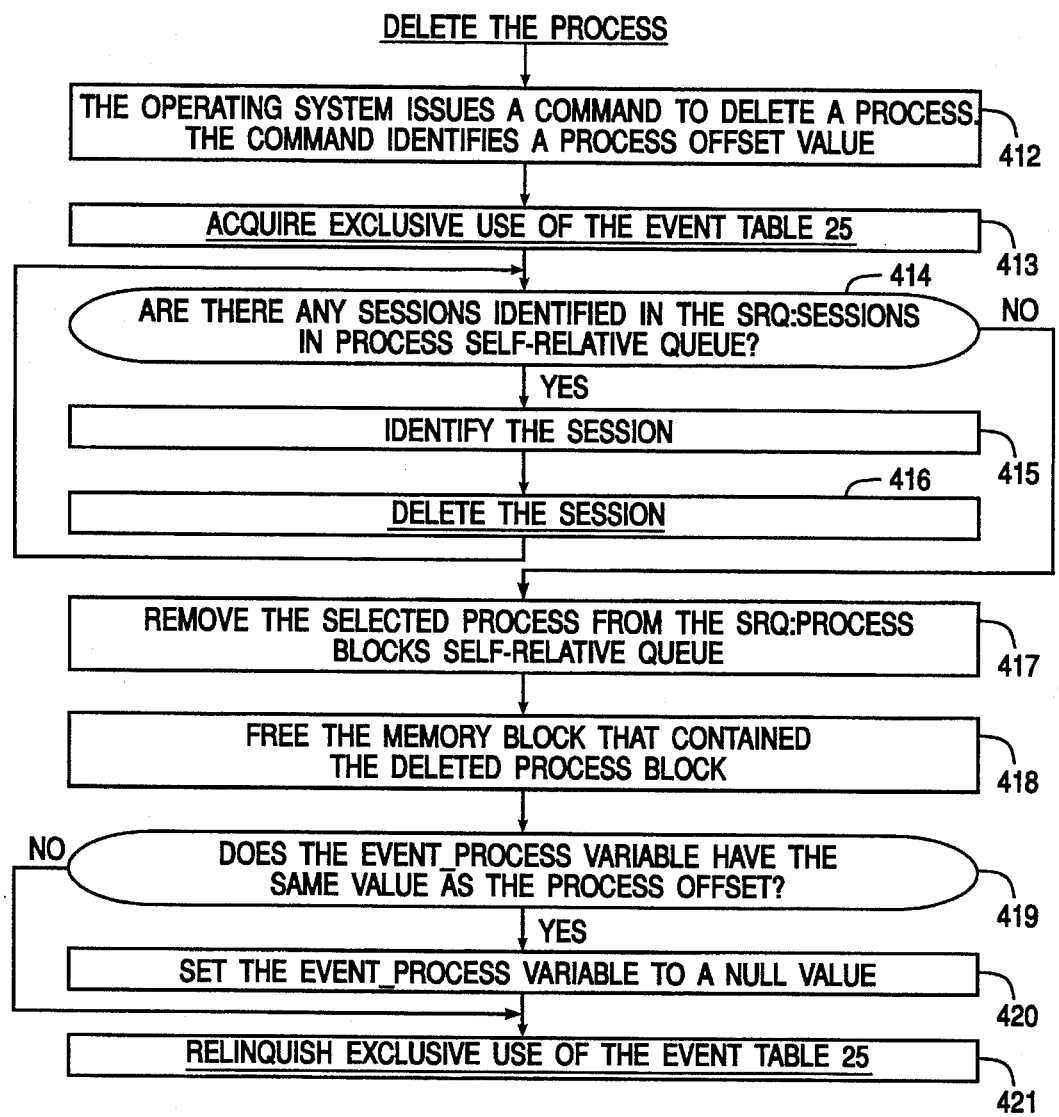
FIG. 27 depicts further detailed steps that the event manager uses during the recovery procedure of FIG. 26 and otherwise to delete a process block from the event table of FIG. 2.

There are two ways to invoke the sequence of FIG. 27 for deleting a process. The exit handler of FIG. 26 in one sequence that can invoke the sequence for deleting a process. The other is a specific command to delete the process from the event dependent process or auxiliary programs whenever that process will no longer interact with the event manager 24, as represented by step 412 in FIG. 27. In either situation, the event manager 24 acquires exclusive use of the event table (step 413) in accordance with the sequence of FIG. 11. Then the event manager 24 tests the SRQ:SESSIONS IN PROCESS self-relative queue (step 414). If the queue is not empty, the event manager 24 identifies the session in step 415 and deletes the session in step 416 using the sequence of FIG. 24.

When all the sessions are deleted and the SRQ:SESSIONS IN PROCESS self-relative queue is empty, the event manager branches from step 414 to step 417, removes the selected process from the SRQ:PROCESS BLOCKS self-relative process queue and frees the memory block in the event table 25 that contained the deleted process block in step 418. If the EVENT_process variable from the event dependent process has the same value of the process offset (step 419), the EVENT_process variable is set to a null value (step 420). In either situation, the event manager 24 then relinquishes exclusive use of the event table in step 421 in accordance with the sequence of FIG. 12.

Referring again to FIG. 26, after the process is deleted, the exit handler examines the acquire_count variable in step 422. If the variable is greater than zero, the event manager 24 runs the procedure of FIG. 12 in step 423 to decrement the acquire_count variable. The procedure continues until the acquire-count variable reaches a zero value. Next the event manager 24 takes any other appropriate actions as may be determined by the parameters of the network. Finally, the event manager 24 sets the EVENT_header variable to a null value thereby notifying the event dependent process that the process no longer exists and it has detached from the event manager.

SUMMARY

As will now be apparent, the combination of the post command triggers as event generators, the event manager and the event table of this invention provides an efficient mechanism for alerting an event dependent process of the occurrence of an event, particularly in a database application. This notification occurs independently of event dependent processes or applications once a process or application indicates an interest in a particular event. No event dependent process polls the database unless an event occurs.

The use of the process blocks, sessions blocks, and parent event blocks allows a central event manager to serve multiple event dependent applications, even at different nodes in a network, and multiple databases. Moreover, this mechanism simplifies the content and reduces the number of network messages that transfer over a network when the database management system is resident in different nodes, particularly with data processing equipment of different manufactures at different nodes. Further, although the description has been directed primarily to synchronous notification of an event, the system is readily adapted for notification of an event on both synchronous and asynchronous modes.

The mechanism of this invention achieves all these objectives by utilizing a new "post event" trigger means that monitors any change in the named fields in the database and reports to the event manager independently of all other processes. The trigger is an example of an event generating means that produces a signal in the form of a post event command each time an event occurs. That is, the trigger can produce a post event command based on either a very simple condition or complex set of conditions. Moreover, a single generates a post event command each time that set of conditions is met anywhere in the database. Thus, if the commodities database of the example includes hundreds of commodities, the trigger in FIG. 3 will produce a post event command each time a change occurs in the price of any of those commodities, not just commodities of interest, although the post event command will identify the particular commodity that has been changed.

The event manager acts as a programmable filter for this information. Each event dependent process identifies events of interest to the event manager and thereby establishes the parameters of the filter that the event table stores independently of the triggers, although a relevant trigger must exist. Then the event manager responds to each post event command from the database by examining event blocks. An event block exists only if some event dependent process has indicated an interest in that particular event. If an event block is found, the event manager increments an event count in that block. Otherwise, there is no action taken in response to a post command trigger. Thus the interaction between the post event command and the event block produces a first filtering action.

Whenever an event dependent process indicates an interest in a particular event, such as a change in the price of soybeans and porkbellies, the event dependent process performs an initializing transaction in which it produces an event buffer and result buffer in the event dependent process for each event of interest. Then the event dependent process sends a message to the event manager requesting an initialization of its interest in events. The event manager utilizes this message to establish the needed array of event blocks, process blocks and session blocks as well as request blocks and interest blocks. In the specific example, the event manager produces a process block, a single session block under that process block, a single request block under that session block and two interest blocks under the request block. Each interest block contains a count that represents either the initial count or the last recorded count in the event dependent process.

Whenever a difference exists between a threshold count in an interest block and an event count in a corresponding event block identified by that interest block, a reportable event exists. The event manager produces a single message that contains the name of each event of interest as defined in a request and the current event count for that event name. Then the event manager notifies the event dependent process that a reportable event has occurred. This sequence produces further filtering because a single notification occurs even if multiple events need to be reported.

Next the event dependent process requests the message and transfers the message into its result buffer for comparison with the previous conditions recorded in the event buffer. The event dependent process can determine if a change exists and take appropriate action as it requires. When all the differences have been identified, the event dependent process copies the result buffer into the event buffer so each of the event counts is updated and the event dependent process records the state of the database with respect to its interests. As a result the next request will transfer these new counts into the threshold counts of the individual interest blocks if the request is repeated.

Notifications required by this mechanism impose minimal message requirements on a network in comparison with prior database polling techniques. The mechanism of this invention provides this event alerting function with a minimal overhead on the database manager and on the processes accessing the database. Moreover, the forming of a message relating to all interest events allows multiple events to be transferred in a single message and, as previously indicated, this again reduces utilization of the network where message length tends to have an insignificant impact on the amount of time that work requires to process a message.

This invention has been disclosed in terms of certain embodiments. It will be apparent that many modifications can be made to the disclosed embodiment without departing from the invention. Therefore, it is the intent of the appended claims to cover all such variations and modifications as come within the true spirit and scope of this invention.

What is claimed as new and desired to be secured by Letters Patent of the United States is:

1. A multi-user computer system comprising:

a database server providing access to a database of information including at least one database field, said database server including a database manager for controlling said access to said database;

a first computer operating a process which requests modification of information stored in the database;

at least one second computer operating a process which is dependent on occurrence of a selected modification of information stored in the database such that a selected database field in the database attains a preselected value;

means for requesting that said database server notify said at least one said second computer upon occurrence of said selected modification of information; and event alerting means, residing on the database server and operably coupled to the database manager, said event alerting means detecting modification of information stored in the database and notifying said at least one second computer upon occurrence of said selected modification of information.

2. The system of claim 1, wherein said first and second computer are coupled to said database server through a communication network.

3. The system of claim 1, wherein said database stores information as values in database fields, and wherein said modification of information includes changing a value of at least one database field.

4. The system of claim 3, wherein the process of said at least one second computer is dependent on a selected one of the database fields attaining a preselected value.

5. The system of claim 1, wherein said first computer includes means for posting a command to said database manager for modifying information stored in the database.

6. The system of claim 1, wherein said at least one second computer includes means for posting a command to said database manager for requesting notification of occurrence of said selected modification of information.

7. The system of claim 1, wherein said means for requesting includes means for requesting asynchronous notification of said selected modification of information whereby said at least one second computer operates other processes while awaiting said notification.

8. The system of claim 1, wherein said means for requesting includes means for requesting synchronous notification of said selected modification of information, whereby said at least one second computer suspends execution of said process which is dependent on occurrence of said selected modification of information while awaiting said notification.

9. In a multi-user computer system, the system including a relational database having data fields storing values which change in response to clients in communication with a database server, a method for notifying at least one client of a change occurring in the database, the method comprising:

(a) defining preselected changes to the database to comprise a set of events which are of interest to the clients, said events including an event of a data value stored in a selected threshold;

(b) registering with said database server a request from at least one of said clients to be notified upon occurrence of a selected one of the events;

(c) receiving at said database server a request to change a data value stored in one of the data fields;

(d) determining by said database server if the request to change a data value specifies a change that is one of said preselected changes defining an event of interest; and (e) if the request to change a data value specifies a change that is one of said preselected changes defining an event of interest, notifying all clients registered with said database server of occurrence of the event of interest.

10. The system of claim 9, wherein said events further include an event of changing a value stored in a selected data field to a preselected value.

11. The system of claim 9, wherein said events include an event of changing a value stored in a selected data field to a value which greater than or equal to a preselected threshold.

12. The system of claim 9, wherein said events include an event of changing a value stored in a selected data field to a value which less than or equal to a preselected threshold.

13. The system of claim 9, wherein step (a) includes defining a procedure (trigger) for each of the preselected changes to the database, each trigger for posting an event signal upon occurrence of its preselected change.

14. The system of claim 9 wherein after step (c) further comprises:

suspending operation of at least one of said clients while awaiting synchronous notification of said selected event.

15. The system of claim 9, further comprising:

(f) upon receipt of notification, retrieving information describing said event of interest.

16. The system of claim 15, wherein said information describing said event of interest includes the value for a database field whose change constitutes the event.

17. The system of claim 9, wherein after step (c) further comprises:

switching operation of at least one of said clients to another task while awaiting asynchronous notification of said selected event.

18. In a multi-user relational database management system, the system including a database server providing access to a database, the database server in communication with a plurality of clients, a method for notifying clients of particular events occurring in the database including information stored in data fields, the method comprising:

(a) defining a set of events indicating changes to the database which are of interest to at least one client, each of said at least one client requiring notification of occurrence of one of the events, and said set including an event which is defined to occur when a selected one of the data fields changes in value a preselected number of times;

(b) posting a transaction to the database server, said transaction specifying at least one of the events said at least one client requires notification of occurrence;

(c) upon occurrence of one of said events, determining by the database server which clients require notification of occurrence of said one of said events, said one of said events indicating a committed change in data in said database; and (d) sending a notification from said database server to each said at least one client which requires notification of said one of said events which has occurred.

19. The method of claim 18, wherein after step (b) further comprises:

initiating by at least one client a transaction which requires occurrence of a selected one of the events before the transaction can be committed; and committing the transaction upon notification that the selected event has occurred.

20. The method of claim 19, wherein said at least one client initiating the transaction enters a wait state while awaiting notification that the selected event has occurred.

21. The method of claim 19, wherein said at least one client initiating the transaction continues to process other transactions while awaiting notification that the selected event has occurred.

22. The method of claim 18, wherein step (d) includes:

transmitting an event message to each said at least one client requiring notification, said message including information describing a particular one of said events which has occurred.

23. The method of claim 22, wherein said database includes information stored in data fields, and wherein said message includes information describing a change in value of one of the data fields.

24. The method of claim 16, wherein said set of events further includes an event which is defined to occur when a selected one of the data fields reaches a threshold value.

25. The method of claim 18, wherein said database includes information stored in data fields, and wherein said set of events includes an event which is defined to occur when a selected one of the data fields changes in value a preselected number of times.

* * * * *